(12) United States Patent
Misumi et al.

(10) Patent No.: US 8,441,956 B2
(45) Date of Patent: May 14, 2013

(54) MARINE WIRELESS COMMUNICATION SYSTEM

(75) Inventors: Yoshiyuki Misumi, Wako (JP); Manabu Dobashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 353 days.

(21) Appl. No.: 13/015,172

(22) Filed: Jan. 27, 2011

(65) Prior Publication Data

US 2011/0188392 A1 Aug. 4, 2011

(30) Foreign Application Priority Data

Jan. 29, 2010 (JP) ................. 2010-018111
Jan. 29, 2010 (JP) ................. 2010-018189
Jan. 29, 2010 (JP) ................. 2010-018212
Jan. 29, 2010 (JP) ................. 2010-018222
Jan. 29, 2010 (JP) ................. 2010-018245

(51) Int. Cl.
*H04B 7/15* (2006.01)
*H04B 1/38* (2006.01)
*H04W 4/00* (2009.01)
*H04W 24/00* (2009.01)

(52) U.S. Cl.
USPC ........... 370/252; 370/328; 370/329; 370/331; 455/11.1; 455/436; 340/7.29

(58) Field of Classification Search .......... 370/252–331; 455/11.1, 436, 442–444, 569.1, 573; 340/7.29, 340/425.5, 539.11; 701/117, 301
See application file for complete search history.

(56) References Cited

U.S. PATENT DOCUMENTS

| | | | |
|---|---|---|---|
| 5,163,158 A * | 11/1992 | Tendler et al. | 455/11.1 |
| 7,251,453 B1 * | 7/2007 | Newman et al. | 455/11.1 |
| 7,398,088 B2 * | 7/2008 | Belkin et al. | 455/439 |
| 2002/0006753 A1 | 1/2002 | Steinhauser | |
| 2003/0085805 A1 * | 5/2003 | Paulo | 340/425.5 |
| 2008/0003946 A1 | 1/2008 | Lee et al. | |
| 2008/0020656 A1 | 1/2008 | Yamada et al. | |
| 2009/0323649 A1 * | 12/2009 | Dayama | 370/338 |

FOREIGN PATENT DOCUMENTS

| | | |
|---|---|---|
| EP | 1633104 A1 | 3/2006 |
| JP | 2004-228773 | 8/2004 |

* cited by examiner

*Primary Examiner* — Afsar M Qureshi
(74) *Attorney, Agent, or Firm* — Rankin, Hill & Clark LLP

(57) ABSTRACT

A marine wireless communication system is capable of reliably and stably monitoring an outboard engine unit in a watercraft. The marine wireless communication system comprises at least one first wireless device disposed in at least one outboard engine unit secured to a stern of a watercraft, and at least one second wireless device disposed inside the watercraft, the first wireless device communicating with the second wireless device according to a predetermined protocol.

17 Claims, 18 Drawing Sheets

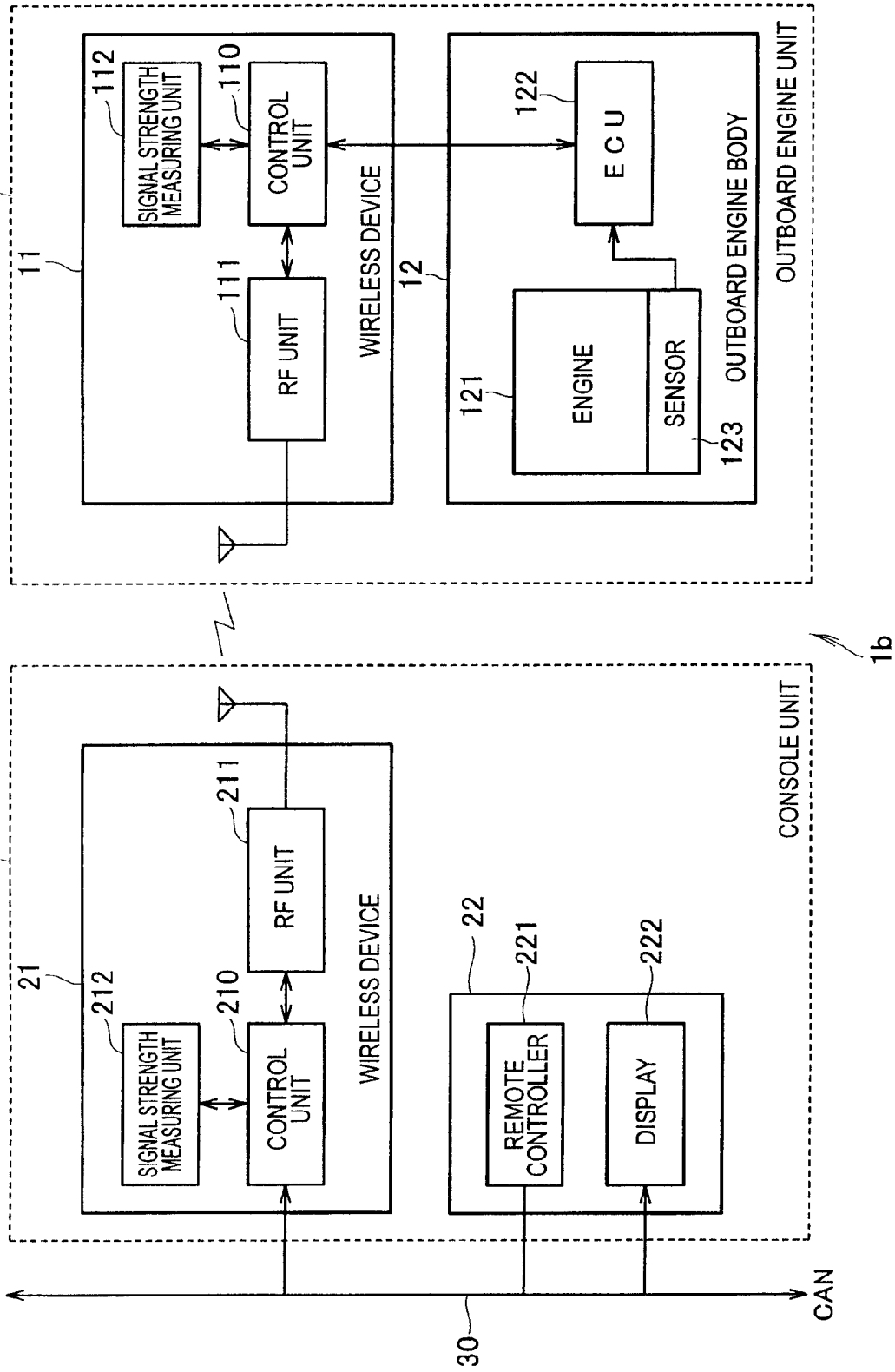

FIG.9
(a)
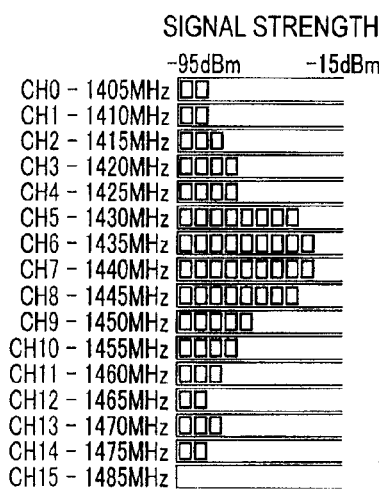
SIGNAL STRENGTH
-95dBm    -15dBm
CH0 - 1405MHz
CH1 - 1410MHz
CH2 - 1415MHz
CH3 - 1420MHz
CH4 - 1425MHz
CH5 - 1430MHz
CH6 - 1435MHz
CH7 - 1440MHz
CH8 - 1445MHz
CH9 - 1450MHz
CH10 - 1455MHz
CH11 - 1460MHz
CH12 - 1465MHz
CH13 - 1470MHz
CH14 - 1475MHz
CH15 - 1485MHz
(b)
| COMMUNICATION CHANNEL | PACKET ERROR RATE |
|---|---|
| 0 | 0% |
| 1 | 0% |
| 2 | 0% |
| 3 | 0% |
| 4 | 0% |
| 5 | 25% |
| 6 | 29% |
| 7 | 28% |
| 8 | 25% |
| 9 | 5% |
| 10 | 0% |
| 11 | 0% |
| 12 | 0% |
| 13 | 0% |
| 14 | 0% |
| 15 | 0% |
FIG.10
(a)
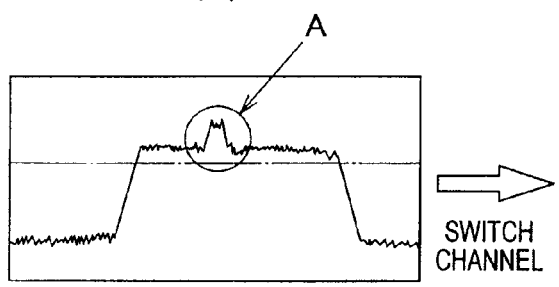
A
→ SWITCH CHANNEL
(b)
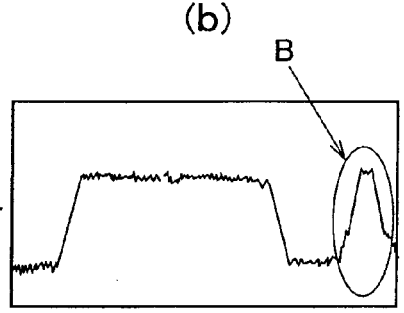
B

MARINE WIRELESS COMMUNICATION SYSTEM

FIELD OF THE INVENTION

The present invention relates generally to a marine wireless communication system and, more particularly, to a technology in which a first wireless device disposed in an outboard engine unit affixed to the stern of a watercraft and a second wireless device disposed in the cabin of the watercraft perform data communication via short-range wireless communication.

BACKGROUND ART

In a moving vehicle such as an automobile, agricultural machine or watercraft, remote monitoring systems are known to monitor such parameters as the engine operating conditions and position information. An outboard engine unit used in a watercraft, in particular, has to operate continuously for long periods of time under harsh conditions. A demand has accordingly existed for maintenance conditions as well as the operating status to be monitored remotely.

Therefore, a technology is known in which a mobile telephone is housed in an outboard engine unit secured to the stern of a watercraft, a remote set is connected inside the cabin to operate the mobile telephone remotely, and maintenance and communication are performed externally by operating the remote set. This technology has been disclosed, for example, in Japanese Patent Application Laid-Open Publication No. 2004-228773 (JP 2004-228773 A).

However, the technology disclosed in JP 2004-228773 A is not suitable for use at sea where there are no base stations when underway. In this situation, remote monitoring related to operating and maintenance conditions cannot be performed wirelessly. Also, when this technology is used in various countries around the world, there are areas in which communication cannot be conducted using the available communication protocols. Therefore, remote monitoring similar to the case described above cannot be performed. As a result, there is a demand for reliable and stable onboard monitoring of an outboard engine unit.

SUMMARY OF THE INVENTION

In response to the aforementioned demand, the present invention provides a marine wireless communication system that is able to reliably and stably perform onboard monitoring of an outboard engine unit.

The marine wireless communication system of the present invention has at least one first wireless device disposed on at least one outboard engine unit secured to a stern of a watercraft, and at least one second wireless device disposed inside the watercraft. The first wireless device communicates with the second wireless device according to a predetermined protocol. In the marine wireless communication system of the present invention, the first wireless device disposed in the outboard engine unit, for example, retrieves information related to the operating conditions of the outboard engine unit detected by a sensor, and sends the information to the second wireless device disposed inside the watercraft at a predetermined interval. When the second wireless device disposed inside the watercraft receives the information related to the operating conditions of the outboard engine unit from the first wireless device, for example, it displays the information on an output device. In this way, the operating conditions of the outboard engine unit can be monitored onboard reliably and stably.

Preferably, the first wireless device has a first communication unit for performing data communication with the second wireless device based on a first communication protocol, and a second communication unit for performing data communication with the second wireless device based on a second communication protocol separate from the first communication protocol; and the second wireless device has a first communication unit for performing data communication with the first wireless device based on the first communication protocol, and a second communication unit for performing data communication with the first wireless device based on the second communication protocol separate from the first communication protocol. The first wireless device starts an initial setting process for the first communication unit and the second communication unit; and, after the initial setting process has been completed, starts data communication between the first communication unit or the second communication unit and the first communication unit or the second communication unit of the second wireless device based on the first communication protocol or the second communication protocol. For example, by starting data communication first from the second communication unit for performing communication based on the second communication protocol which requires less time in the initial setting process, data communication can be achieved at a higher speed than data communication performed by the first communication unit for performing communication based on the first communication protocol. The first communication unit for communicating based on the first communication protocol can be used for primary communication, and the second communication unit for communicating based on the second communication protocol which requires less time in the initial setting process than the first communication protocol can be used for backup purposes. Thereby, when a communication failure occurs in one of the wireless devices of the system because of communication disruptions and breakdowns due to radio interference, the other wireless device in the system can be used to provide backup, and reliable data communication can be maintained.

Preferably, the first wireless device has a signal strength measuring unit for successively measuring the signal strength of a plurality of previously allocated communication channels when power has been turned on and before the outboard engine unit has been started, and a control unit for switching to another communication channel free of radio interference among the plurality of communication channels when the measured signal strength has been compared to a predetermined signal strength threshold value, and the measured signal strength has been determined to be lower than the signal strength threshold value. Therefore, the system can be automatically switched to a communication channel with very little radio interference even when radio interference occurs due to a wireless device using the same frequency band. This can ensure stable communication before getting underway. As a result, the system is less susceptible to radio interference due to undesirable signals and reflected signals from other wireless devices, and situations can be avoided in which warnings sent by the outboard engine unit such as overheating and sensor malfunction warnings cannot be received.

Preferably, the at least one outboard engine unit is among a plurality of outboard engine units, and the at least one first wireless device is among a plurality of first wireless devices; and each of the plurality of first wireless devices has a communication unit for performing data communication with the at least one second wireless device, and a control unit for performing mutual authentication between the second wireless devices and a first wireless device disposed in an outboard engine unit, and performing data communication between the first wireless device and a mutually authenticated second wireless device via the communication unit, when an outboard engine unit among a plurality of outboard engine units has been detected to have started.

Because entering the initial settings for identifying the counterpart communication devices is automated, ROM can be written to identify the device on the other end without requiring a third party to change or add outboard engine units. Therefore, the number of steps required during initialization can be reduced, and the burden placed on maintenance personnel and users can be lessened.

Preferably, the at least one outboard engine unit is among a plurality of outboard engine units, and the at least one first wireless device is among a plurality of first wireless devices; each of the plurality of first wireless devices uses a communication channel allocated in advance to a particular outboard engine unit among the plurality of outboard engine units, and sends to the at least one of the second wireless devices information regarding engine operating conditions detected by a sensor provided to the particular outboard engine unit; and the second wireless device switches successively between communication channels, receives information regarding operating conditions for the outboard engine unit, and performs information processing based on the received information.

Because the communication channels used when engine information is sent and received are not duplicated, and conflicts between wireless devices are avoided, stable communication is possible. Also, because the need for unnecessary one-to-one communication is eliminated, superfluous rigging tasks need not be performed.

Preferably, the at least one second wireless device is among a plurality of second wireless devices; and each of the second wireless devices performs communication with a first communication unit in the first wireless device via a first communication unit for performing communication based on a first communication protocol; and performs data communication with at least one other watercraft via a second communication unit for performing communication based on a second communication protocol for communicating over distances longer than with the first communication protocol.

In this way, the operating conditions for an outboard engine unit can be monitored inside the cabin of the watercraft using the first communication protocol, and location information can be exchanged between watercraft, for example, using the second communication protocol. Therefore, a single wireless communication system can be achieved for monitoring the operating conditions of an outboard engine unit and monitor the location information from other watercraft, and the reliability of wireless communication in these situations can be ensured.

BRIEF DESCRIPTION OF THE DRAWINGS

Certain preferred embodiments of the present invention will be described in detail below, by way of example only, with reference to the accompanying drawings, in which:

FIG. 6 is a block diagram showing a marine wireless communication system according to a second embodiment of the present invention;

FIG. 9 illustrates a relationship between signal strength and transmission error rate in the marine wireless communication system according to the second embodiment of the present invention;

FIG. 10 illustrate test results for avoiding radio interference as waveforms performed by the marine wireless communication system according to the second embodiment of the present invention;

DETAILED DESCRIPTION OF THE PREFERRED EMBODIMENTS

The relationship between the outboard engine unit 10 and the cabin (console unit) from which the maritime wireless communication system is constituted will be explained with reference to FIG. 1 in order to facilitate understanding of the configuration of the maritime wireless communication system of the present invention. The internal configuration of the outboard engine unit 10 will also be explained with reference to FIG. 2.

Figure 1:
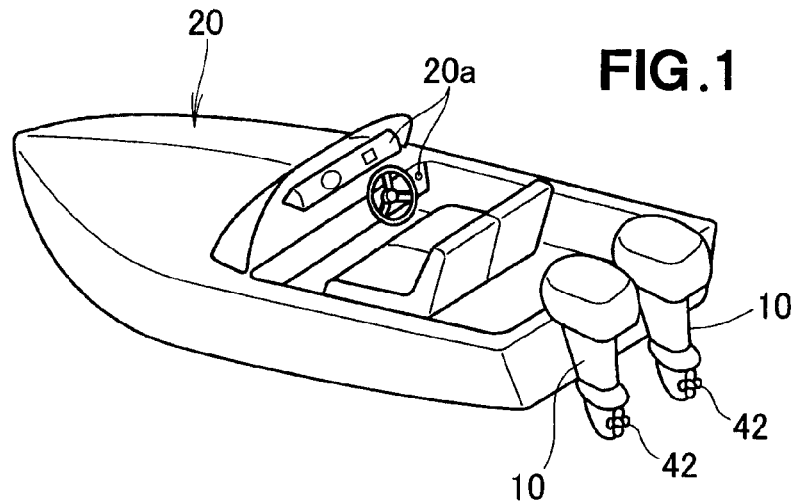
FIG. 1 is a perspective view of a watercraft employing the present invention.

As shown in FIG. 1, an outboard engine unit 10 is arranged and secured at the stern of a watercraft 20. The outboard engine unit 10 is provided with a propeller 42 in the lower portion and an engine in the inside. The propeller 42 is rotated by the transmission of power from the engine, and thrust is generated for the watercraft 20. For example, two outboard engine units 10 can be arranged and secured, and connected via a link mechanism (not shown) to operate in conjunction with mechanical steering. This is called a multiple-unit configuration. Here, the two outboard engine units 10, 10 have their own propeller 42, 42, and two engines are installed in the upper portions. The propellers 42, 42 are caused to rotate by the transmission of power from their own engine, and thrust is generated for the watercraft 20.

A console unit 20a is disposed near the operator's seat inside the cabin. As described below, a remote controller (operation input device) operated by the operator, and a display (output device) for displaying various types of measurements are installed in the console unit 20a. The remote controller swings freely from the initial position both forward and in reverse (away from and towards the operator) using, for example, a lever. The operation of the operator inputs instructions such as a shift change for the outboard engine unit 10 or the engine speed. As described below, the marine wireless communication system of the present invention is achieved by disposing a first wireless device inside an outboard engine unit 10 secured to the stern of the watercraft 20, and a second wireless device disposed inside the console unit 20a. The outboard engine unit 10 is maintained by short-range wireless communication between the first wireless device and the second wireless device.

Figure 2:
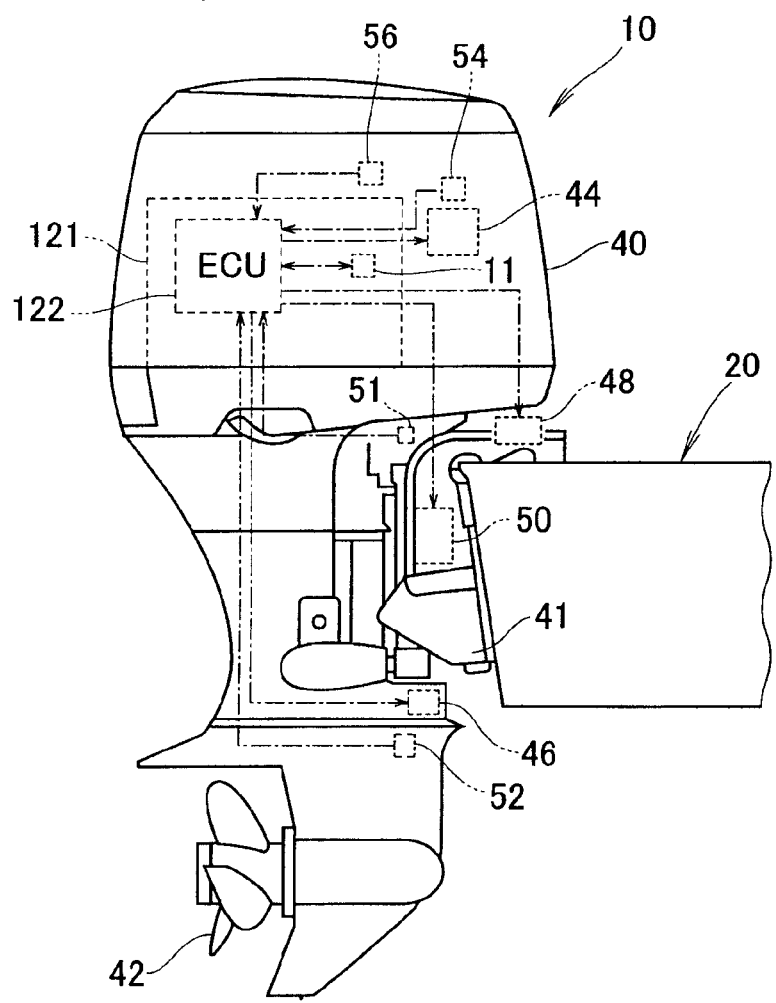
FIG. 2 is an internal view of an outboard engine unit shown in FIG. 1.

As shown in the internal configuration of the outboard engine unit 10 in FIG. 2, an electronic control unit (ECU 122) is mounted near an engine 121 covered by an engine cover 40, and connected to a wireless device 11 mounted in similar manner via a bidirectional signal line. Power from the engine 121 is transmitted to a propeller 42 and the watercraft 20 is propelled forward and in reverse by its rotation. Near the stern bracket 41 secured to the stern of the watercraft 20 are disposed an actuator (electric motor for steering 48) for rotating a swivel shaft (not shown) and turning the outboard engine unit 10, and a power tilt/trim unit 50 for adjusting the tilt angle and trim angle of the outboard engine unit 10. Both are connected to an ECU 122 via signal lines.

An actuator (electric motor for a throttle 44) for opening and closing a throttle valve is disposed in an intake tube of the engine 121, and connected to the ECU 122. An actuator (electric motor for a shift change 46) for rotating a shift rod (not shown) is also disposed in the lower portion of the outboard engine unit 10, and connected via a signal line to the ECU 122.

Near the swivel shaft and the shift rod (not shown) are disposed a rotation angle sensor 51 for the switch shaft and a rotation angle sensor 52 for the shift rod. These sensors 51, 52 output signals corresponding to the rotation angle of the swivel shaft and signals corresponding to the rotation angle of the shift rod. Near the throttle valve (not shown) is disposed an throttle angle sensor 54, and this throttle angle sensor 54 outputs signals corresponding to the throttle angle. Near the crank shaft of the engine 121 is disposed a crank angle sensor 56, which outputs signals corresponding to the speed of the engine 121.

The output from the various sensors 51, 52, 54, 56 is outputted to the ECU 122 via signal lines. The ECU 122 drives the electric motor for steering 48 to steer the outboard engine unit 10, and activates the power tilt/trim unit 50 to adjust the tilt angle and trim angle of the outboard engine unit 10 based on the output from the sensors 51, 52, 54, 56 and the remote controller in the console unit 22a. Also, the electric motor for the throttle 44 is driven to adjust the speed of the engine 121, and the electric motor for a shift change 46 is driven to perform a shift change.

Figure 3:
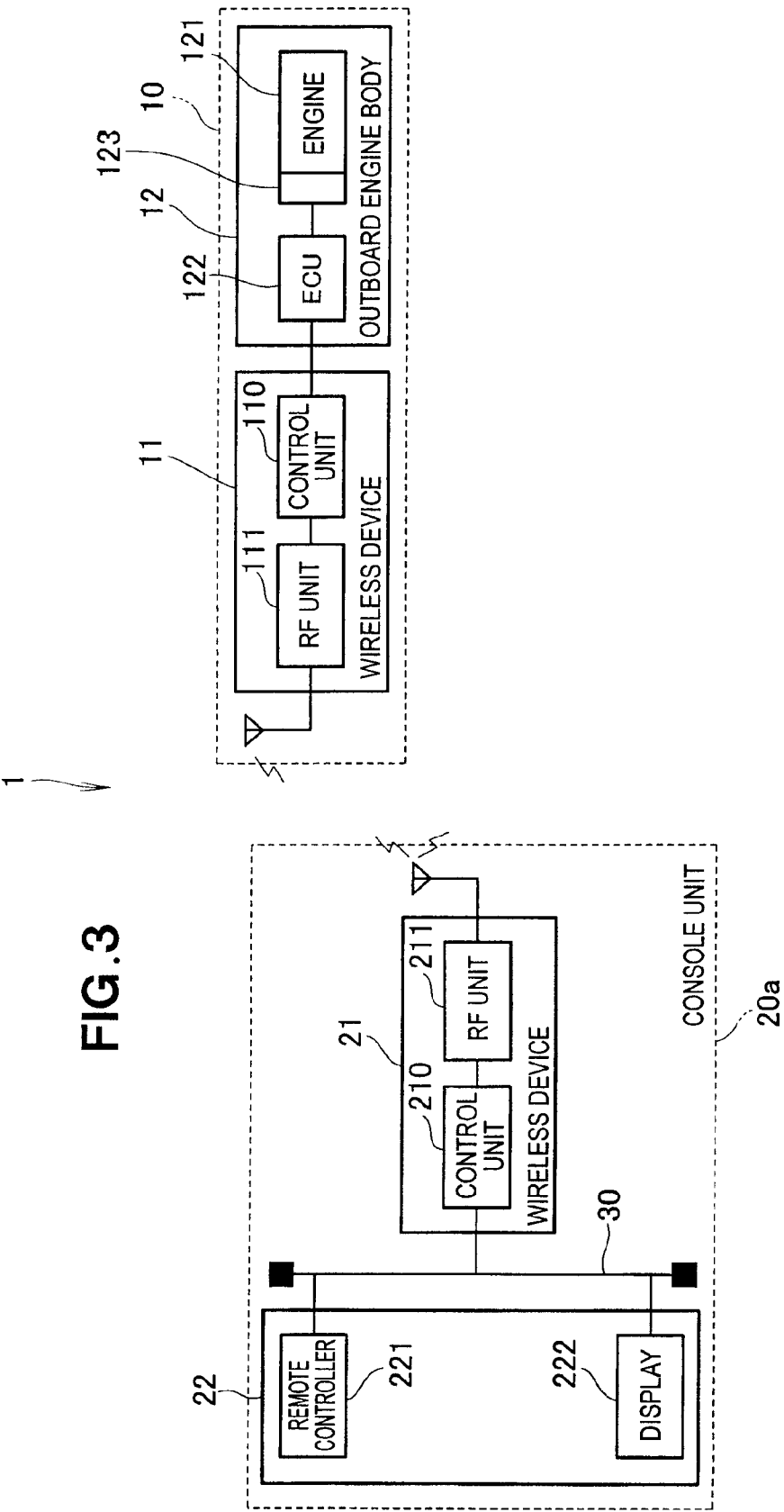
FIG. 3 is a block diagram showing a marine wireless communication system according to the present invention.

The following is an explanation of the maritime wireless communication system of the present invention with reference to FIG. 3. As shown in FIG. 3, the maritime wireless communication system 1 of the present invention is constructed from a first wireless device 11 and a second wireless device 21. The first wireless device 11 is mounted in an outboard engine unit 10 secured to the stern of the watercraft 20, and the second wireless device 21 is mounted inside the console unit 20a. The first wireless device 11 is a wireless communication module for conducting short-range wireless communication. For example, it performs data communication with the second wireless device 21 based on a wireless communication protocol such as wireless LAN (local area network), Bluetooth®, ZigBee® or Wi-Hi®. The second wireless device 21 is also a wireless communication module for conducting short-range wireless communication based on the same wireless communication protocol as the first wireless device 11. It performs data communication with the first wireless device 11. There is a single short-range wireless communication standard for Bluetooth, ZigBee, and Wi-Hi.

The first wireless device 11 is constructed from a control unit 110 and an RF (radio frequency) unit 111. The control unit 110 comprises, for example, a microprocessor. It uses the frequency of the communication channel previously allocated to the outboard engine unit 10 to send the engine information detected by the sensors described below to the second wireless device 21 via the RF unit 111 in accordance with a short-range wireless communication standard such as ZigBee or Bluetooth. The RF unit 111 is a high-frequency circuit used to send and receive data in accordance with the short-range wireless communication standard mentioned above.

The main unit 12 of the outboard engine unit includes an engine 121, ECU 122, and a sensor 123. In the main unit 12 of the outboard engine unit, power is transmitted to the propeller 42 (see FIG. 2) under fuel injection (FI) control of the ECU 122, and the rotation of the propeller generates thrust for the watercraft 20. The engine 121 is a four-cycle gasoline engine. The ECU 122 performs FI control, obtains the engine information detected by the sensors 123 mounted in the various portions of the engine 121, and sends the information via the wireless device 11 to the console unit 20a inside the cabin. The ECU 122 is connected to the control unit 110 in the wireless device 11 for interprocessor communication via a wired serial data communication interface such as a UART (universal asynchronous receiver transmitter).

In addition to the second wireless device 21, a remote controller 221 operated by the operator, and a display 222 serving as an input/output device 22 for displaying various types of measurements are mounted inside the console unit 20a disposed near the operator's seat inside the cabin of the watercraft 20. The remote controller 221 has an ignition key for starting the engine in the outboard engine unit 10, a steering switch for inputting steering instructions, a shift/throttle switch for inputting shift change and speed increase/decrease instructions, an indicator indicating the shift position, and a power tilt/trim switch for inputting tilt angle and trim angle adjustment instructions. The display 222 receives the engine information sent by the first wireless device 11 via the second wireless device 21, and displays the content.

The second wireless device 21 disposed in the console unit 20a is constructed from a control unit 210 and an RF unit 211. The control unit 210 comprises, for example, a microprocessor. It receives the engine information via a previously allocated communication channel based, for example, on the ZigBee protocol. It then processes the received engine information, and sends the information to the display 222 via a CAN (control area network) bus 30. The control unit 210 retrieves via the CAN bus 30, for example, a shift change and engine speed adjustment instructions generated by the operation of the remote controller 221; and the instructions are sent via the RF unit 211 to the first wireless device 11 incorporated in the outboard engine unit 10. The RF unit 211 is, for example, a high-frequency circuit for sending and receiving data in accordance with the ZigBee protocol.

In wireless data communication between an outboard engine unit 10 and a console unit 22a inside a cabin, an important design element is the reliable and stable monitoring of the outboard engine unit 10 from inside the cabin. The following is a more detailed explanation of the maritime wireless communication system 1 of the present invention in individual embodiments. In the embodiments explained below, the blocks assigned the same numerals as the blocks shown in FIG. 3 have the same names and functions as those blocks unless otherwise noted.

Configuration of the First Embodiment

Figure 4:
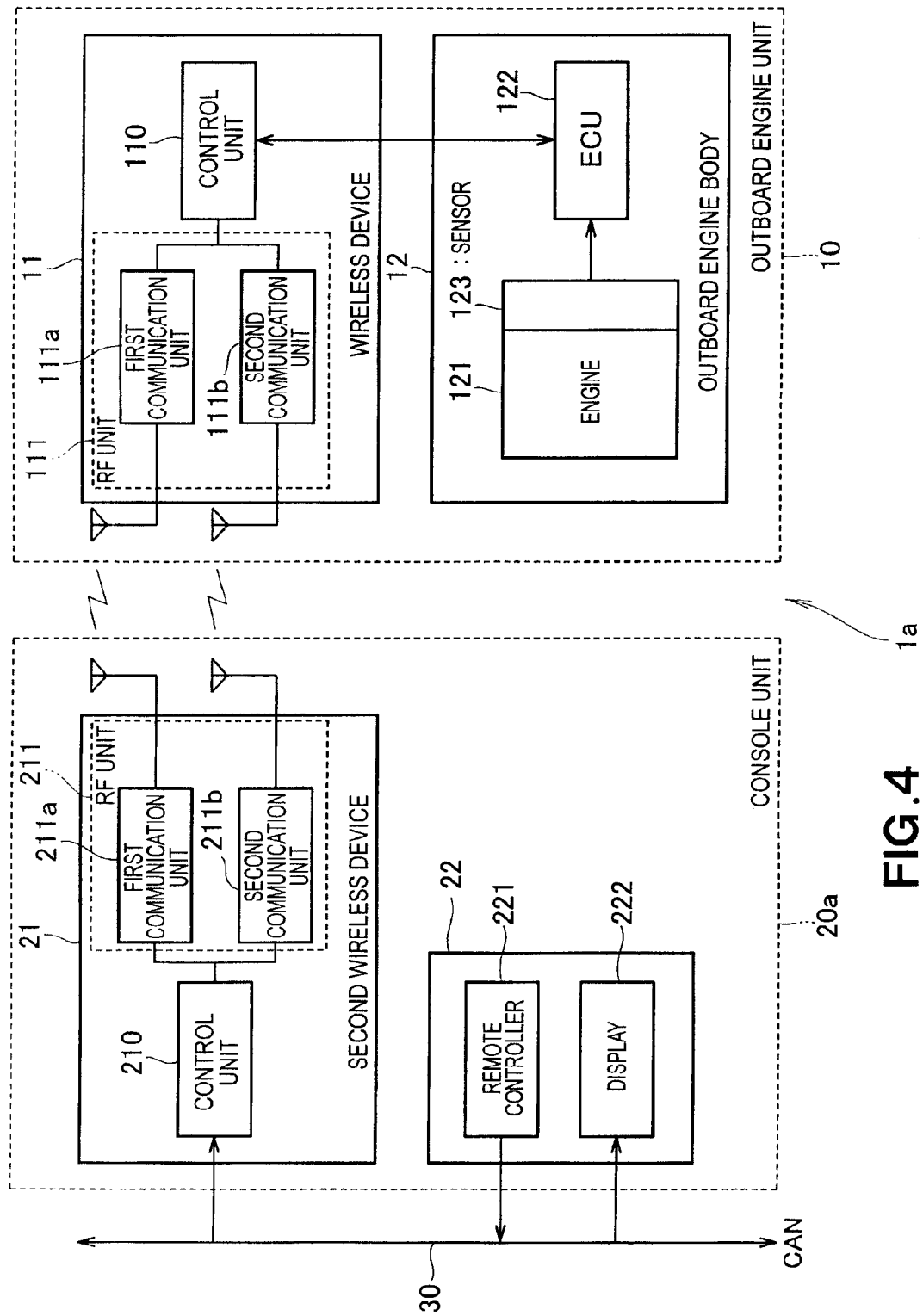
FIG. 4 is a block diagram showing the marine wireless communication system according to a first embodiment of the present invention.

As shown in FIG. 4, the maritime wireless communication system 1a in the first embodiment of the present invention includes a first wireless device 11 and a second wireless device 21. The first wireless device 11 is disposed inside an outboard engine unit 10 secured to the stern of a watercraft 20, and the second wireless device 21 is mounted in the console unit disposed inside the cabin. The first wireless device 11 has a first communication unit 111a, for example, a Bluetooth-compatible communication module for performing data communication based on a first communication protocol such as Bluetooth; a second communication unit 111b, for example, a ZigBee-compatible communication module for performing data communication based on a second communication protocol such as ZigBee, which has a shorter processing time than Bluetooth for the initial settings; and a control unit 110.

The control unit 110 is, for example, a microprocessor, and the first communication unit 111a and the second communication unit 111b are connected via a serial data communication interface such as UART. The control unit 110 starts operating in accordance with a program stored in an internal or external memory unit (not shown) once the engine 121 in the main unit 12 of the outboard engine unit starts up. Specifically, the control unit 110 begins the initial setting processing at the same time as the first communication unit 111a and the second communication unit 111b, and data communication is performed based on ZigBee with the second communication unit 212 in the second communication device 21 when the initial setting process performed by the second communication unit 112, which has a fast processing time for initialization, has been completed. When the processing for initialization has been completed for the first communication unit 111 based on Bluetooth, which has a superior data transmission rate, the control unit 110 switches from ZigBee to Bluetooth, and data communication is performed with (the first communication unit 211 in) the second wireless device 21 based on Bluetooth.

The main unit 12 of the outboard engine unit includes an engine 121, ECU 122, and a sensor 123. The engine 121 transmits power to, and causes rotation of, a propeller 42 (see FIG. 3) under FI control by the ECU 122 to generate the thrust of the watercraft 20. The engine 121 is a four-cycle gasoline engine. The ECU 122 performs FI control, obtains the engine information detected by the sensors 123 mounted in the various portions of the engine 121, and sends the information via the wireless device 11 to the console unit 20a inside the cabin. The ECU 122 is connected to the control unit 110 in the wireless device 11 for interprocessor communication via a wired serial data communication interface such as a UART.

The second wireless device 21 mounted in the console unit 20a has a configuration similar to the first wireless device 11 described above; and has a first communication unit 211 for data communication based on Bluetooth, a second communication unit 212 for data communication based on ZigBee, and a control unit 210. The control unit 210 is connected to the first communication unit 211 and the second communication unit 212 via a serial data communication interface such as UART. The control unit 210 supplies the engine information received by the first communication unit 211 or the second communication unit 212 to the input/output device 22 via the CAN bus 30 in accordance with a program stored in an internal or external memory unit. Operation information transmitted from the remote controller 221 disposed in the console unit 22a via the CAN bus 30 is sent to the first wireless device 11 in the outboard engine unit 10 via the first communication unit 211 or the second communication unit 212.

The input/output unit 22 includes the remote controller 221 mentioned above, and a display 22 on which various measurements are displayed. Both are connected to the control unit 210 in the second wireless device 21 via the CAN bus 30. The remote controller 221 has an ignition key for starting the engine in the outboard engine unit, a steering switch for inputting steering instructions, a shift/throttle switch for inputting shift change and speed increase/decrease instructions, an indicator indicating the shift position, and a power tilt/trim switch for inputting tilt angle and trim angle adjustment instructions.

Operation of the First Embodiment

Figure 5A:
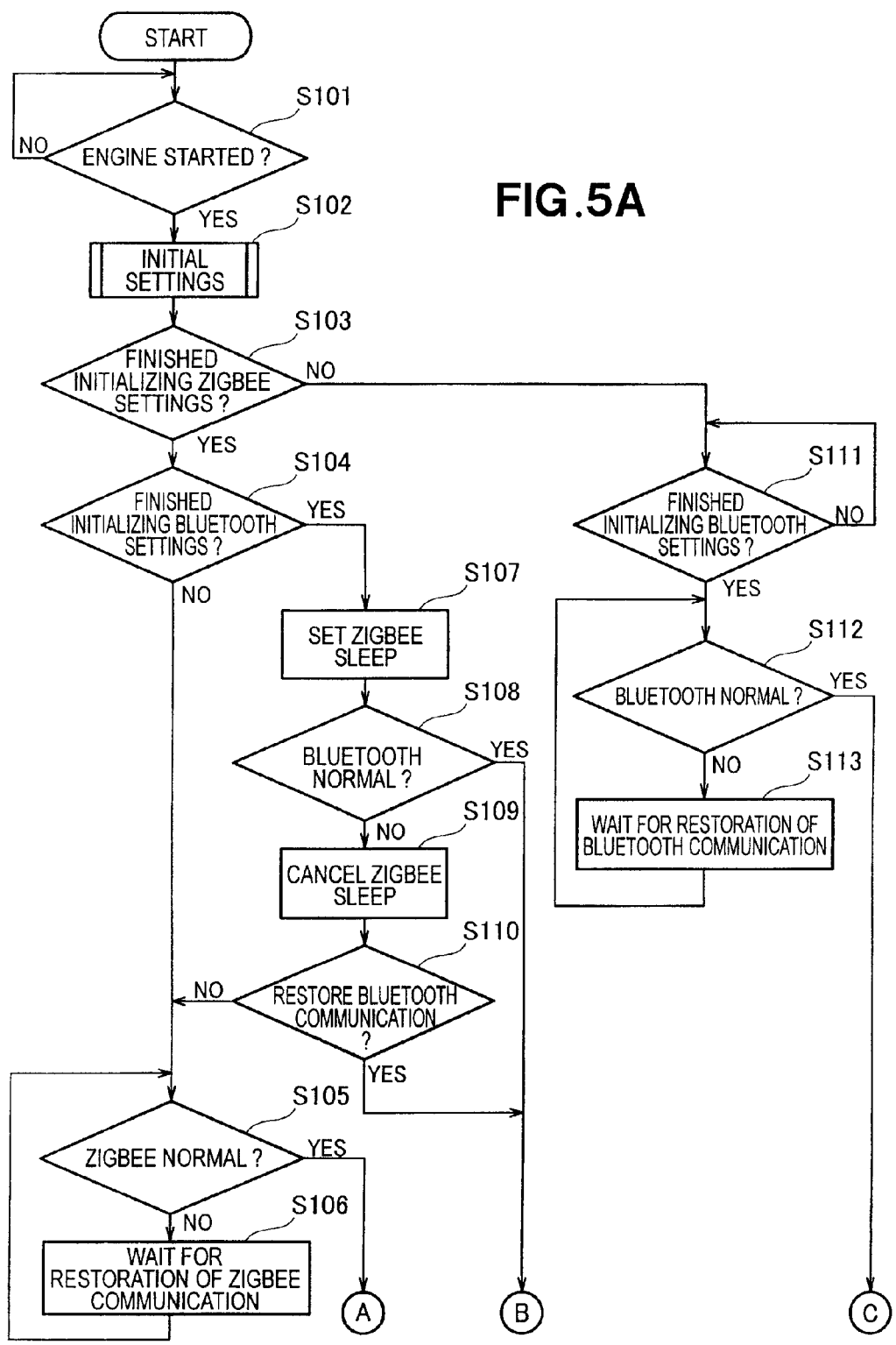
FIG. 5A and FIG. 5B are flowcharts showing operations of the marine wireless communication system according to the first embodiment of the present invention.
Figure 5B:
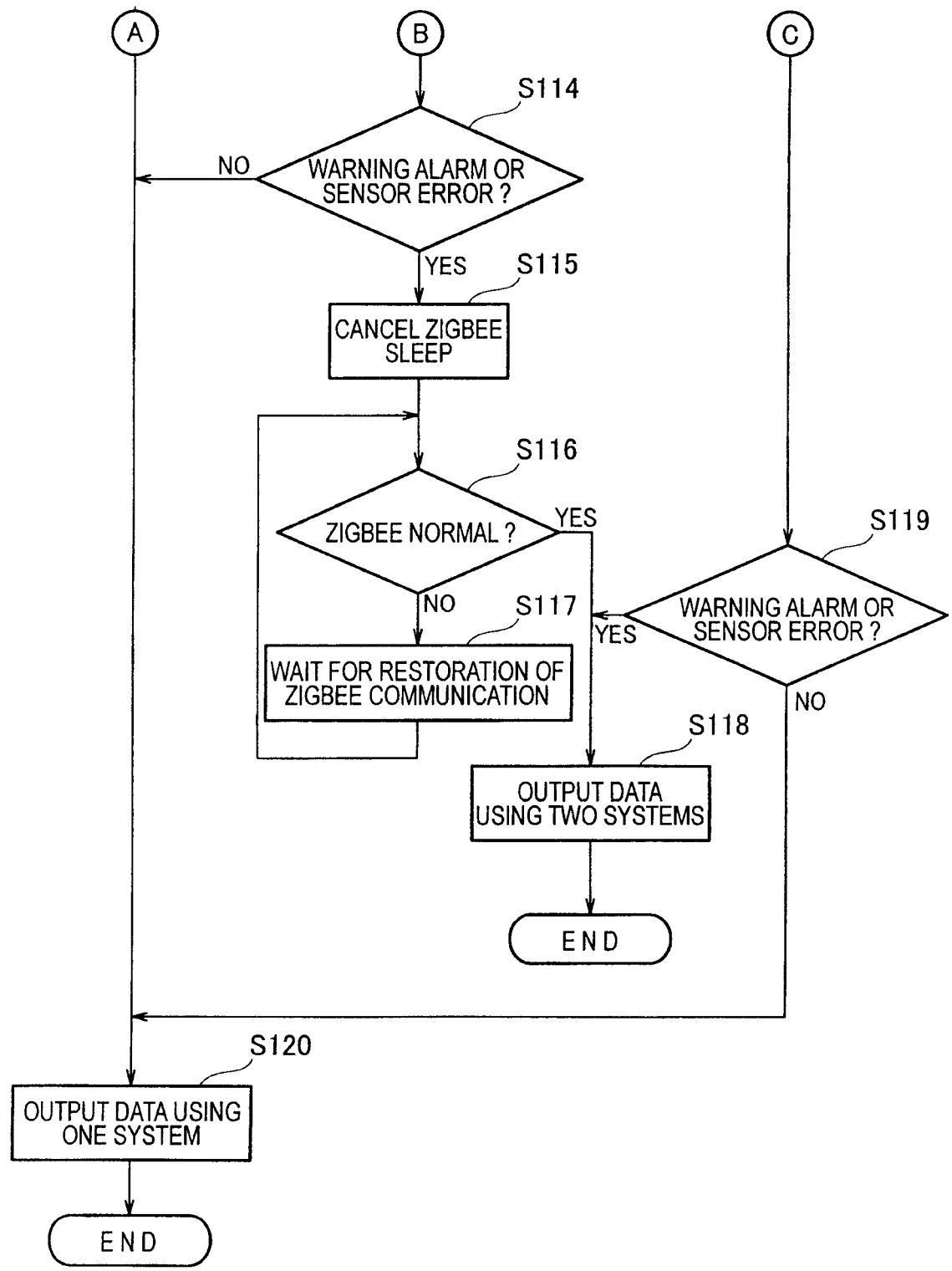

The following is a detailed explanation of the operation of the maritime wireless communication system 1a according to the first embodiment of the invention shown in FIG. 4 with reference to the flowcharts in FIG. 5A and FIG. 5B.

The control unit 110 in the first wireless device 11 inside the outboard engine unit 10 performs interprocessor communication via polling with the ECU 122. By monitoring the status response to polling, the operating condition of the engine 121 can be determined. When the start of the engine 121 is detected (YES in Step S101 of FIG. 5A), the control unit 110 simultaneously starts the initial settings in Bluetooth for the first communication unit 111a, and the initial settings in ZigBee for the second communication unit 111b (Step S102).

The initial setting in Bluetooth for the first communication unit 111a is a pairing operation for determining the other party, and the initial setting in ZigBee for the second communication unit 111b is a setting operation for the communication channel. A pairing operation is performed by setting a Bluetooth-compatible device to ready-to-search status, matching the authentication and encryption settings, and then searching for another Bluetooth-compatible device. The desired party for connection is indicated in a list of Bluetooth-compatible devices in the searchable range, i.e., the radio reception range, and identical pass keys are exchanged (authentication key information, PIN code). A communication channel setting operation is performed by measuring the signal strengths of a plurality of communication channels indicated among the 16 communication channels available to ZigBee, selecting a free channel, determining whether a wireless device wishing to participate in the network belongs on the communication channel, and obtaining the target communication channel information.

The first communication unit 111a and the second communication unit 111b in the first wireless device 11 perform the pairing operation and communication channel setting operation mentioned above with the first communication unit 211a and the second communication unit 211b, respectively, in the second wireless device 21. As is well known, the processing time for these initial settings is several seconds in the case of Bluetooth, and 30 msec in the case of ZigBee. The return to standby status from sleep status in the case of ZigBee is also known to be a very short 15 msec.

Therefore, after the completion of the initialization process in ZigBee for the second communication unit 112a has been detected (YES in Step S103), and before the initialization process in Bluetooth for the first communication unit 111a has been completed (NO in Step S104), the control unit 110 in the first wireless device 11 verifies that communication in ZigBee by the second communication unit 111b is operating normally (YES in Step S105). Then, the engine information obtained via interprocessor communication with the ECU 112 is sent to the second communication unit 212 in the second wireless device 21 (Step S110 in FIG. 5B). Having received the engine information on the outboard engine unit 10 via the second communication unit 212, the control unit 210 in the second wireless device 21 performs processing to display the engine information in the display 222 in the console unit 22.

When communication in ZigBee by the second communication unit 111b in the first wireless device 11 is not operating normally (NO in Step S105 of FIG. 5A), the control unit 110 places communication in ZigBee by the second communication unit 111b in restore standby status (Step S106), and the system returns to the ZigBee normal operation determining process in Step S105. Then, when communication in ZigBee by the second communication unit 111b has been restored and the control unit 110 has confirmed normal communication in ZigBee (YES in Step S105), the engine information obtained via interprocessor communication from the ECU 122 is sent to the second communication unit 211b in the second wireless device 21 using the ZigBee protocol (Step S110 in FIG. 5B).

When, in the Bluetooth initial setting completion determining process in Step S104, the control unit 110 determines that the initial settings have been completed in Bluetooth for the first communication unit 111a (YES in Step S104 of FIG. 5A), the communication currently being performed in ZigBee by the second communication unit 111b is set to rest status (sleep status), and communication in Bluetooth by the first communication unit 111a is started (Step S107).

Next, when normal communication by the first communication unit 111a in Bluetooth has been verified (YES in Step S108), and no warnings or sensor malfunctions have been detected (NO in Step S114 in 5B), the control unit 110 sends the engine information obtained from the ECU 112 via interprocessor communication to the first communication unit 211a of the second wireless device 21 via Bluetooth (Step S110).

A warning or sensor malfunction is an abnormality detected by the sensors 51, 52, 54, 56 built into the main unit 12 of the outboard engine unit. When detected, the ECU 122 notifies the control unit 110, and the control unit 110 recognizes the event. A warning is generated, for example, during overheating.

When, in the Bluetooth communication determining process in Step S108 of FIG. 5A, the control unit 110 determines communication in Bluetooth by the first communication unit 111a is not being performed normally (NO in Step S108), communication according to the ZigBee protocol between the second communication unit 111b and the second communication unit 211b in the second wireless device 21 is released from sleep mode, and set to standby mode (Step S109). Next, until restoration of communication in Bluetooth by the first communication unit 111 has been detected, the control unit 110 activates communication in ZigBee by the second communication unit 111b. On the timing after communication in Bluetooth by the first communication unit 111a has been restored (YES in Step S110), it is determined whether or not a warning or sensor malfunction has occurred (Step S114 in FIG. 5B).

In FIG. 5B, when a warning or sensor malfunction has been recognized (YES in Step S114), the control unit 110 releases the sleep mode for communication in the ZigBee protocol between the second communication unit 111b and the second communication unit 211b in the second wireless device 21, and sets the communication to standby mode (Step S115). Next, the control unit 110 verifies normal communication by the second communication unit 111b in ZigBee (YES in Step S116), and engine information obtained via the ECU 122 is sent to the first communication unit 211a and the second communication unit 211b in the second wireless device 21 using the two systems, the ZigBee protocol with the second communication unit 112 and the Bluetooth protocol with the first communication unit 111 (Step S118).

When communication by the second communication unit 112 in ZigBee is not operating normally (NO in Step S116), communication by the second communication unit 111b in ZigBee is set to restoration standby (Step S117).

In the initial setting completion determining process of Step S103 in FIG. 5A, when the initial settings for the second communication unit 111b in ZigBee have not been completed (NO in Step S103), the control unit 110 awaits completion of the initialization of the first communication unit 111a in Bluetooth (Step S111). When the initial settings for the first communication unit 111a in Bluetooth have been completed (YES in Step S111), the control unit 110 verifies that communication by the first communication unit 111 in Bluetooth is operating normally (YES in Step S112). Also, the engine information obtained from the ECU 122 is sent to the first communication unit 211a in the second wireless device 21 using the Bluetooth protocol (Step S110) only when a warning or sensor malfunction has not been recognized (NO in Step S119 of FIG. 5B).

In the Bluetooth normal operation determining process in Step S112 of FIG. 5A, when communication by the first communication unit 111a in Bluetooth is not operating normally (NO in Step S112), the control unit 110 sets communication in ZigBee to restoration standby (Step S113), and returns to the Bluetooth normal operation determining process in Step S112. When communication by the first communication unit 111a in Bluetooth has been restored, communication is normal (YES in Step S112), and a warning or sensor malfunction has not been recognized (NO in Step S119 of FIG. 5B), the engine information obtained from the ECU 112 is sent to the first communication unit 211a of the second wireless device 21 using the Bluetooth protocol (Step S110).

When a warning or a sensor malfunction has been recognized (YES in Step S119), the control unit 110 sends the engine information obtained via the ECU 122 to the first communication unit 211 and the second communication unit 212 in the second wireless device 21 using the two systems, the Bluetooth protocol of the first communication unit 111a and the ZigBee protocol of the second communication unit 11ab (Step S118).

Advantageous Effect of First Embodiment

As explained above, in the marine wireless communication system 1a according to the first embodiment of the present invention, when the engine in the outboard engine unit 10 starts up, the initial setting process is simultaneously started for the first communication unit 111a and the second communication unit 111b. When the initial setting process is ended for the second communication unit 111b, data communication begins with the second wireless device 21 based on the second communication protocol (e.g., ZigBee). When the initial setting process is ended based on the first communication protocol (e.g., Bluetooth), the system switches from the second communication protocol switches to the first communication protocol, and data communication is performed with the second wireless device 21. Data communication is started first from the second communication unit 111b based on the second communication protocol, which requires less time than the first communication protocol for the initial settings, and then high-speed communication is achieved when data communication begins with the first communication unit 111a based on the first communication protocol. The first communication unit 111a, which performs communication based on the first communication protocol, which is superior to the second communication protocol in terms of transmission speed, is used for primary communication, and the second communication unit 111b which performs communication based on the second communication protocol, is used for backup purposes. When a communication failure occurs in one of the systems because of communication disruptions and breakdowns due to radio interference, the other system can thereby be used to provide backup and reliable data communication can be maintained.

In the first embodiment, when the first wireless device 11 switches from the first communication protocol to the second communication protocol, data communication by the second communication unit 111b based on the second communication protocol is set to communication restoration standby mode. When communication by the first communication unit 111a based on the first communication protocol is cut off, the first communication unit 111a is set to communication restoration standby mode. The second communication unit 111b is released from communication restoration standby mode, and communication can be performed by the second communication unit 111b based on the second communication protocol until the communication restoration processing has been completed. Accordingly, when a communication cutoff or malfunction occurs in one of the systems because of radio interference, the other system can be used to provide backup. Communication can thus continue uninterrupted.

In the first embodiment, when an abnormality in the outboard engine unit 10 is detected by the sensor, the control unit 110 in the first wireless device 11 controls the second communication unit 112, data communication is restarted based on the second communication protocol in communication restoration standby mode, and data communication is simultaneously performed by the first communication unit 111a based on the first communication protocol. When an abnormality occurs in an outboard engine unit 10 while underway, the two systems can perform simultaneous communication with the first communication unit 111a and the second communication unit 111b. Therefore, a reliable wireless communication system can be provided in which stable communication can be achieved even when there is an abnormality in the outboard engine unit 10.

In the explanation of the first embodiment, one-way communication was performed from the first wireless device 11 to the second wireless device 12. However, bidirectional communication including transmission of operational information or the like from the second wireless device 21 to the first wireless device 11 can also be achieved using the same principle. In the explanation of the first embodiment, the first communication unit 111a was a Bluetooth-enabled communication module, and the second communication unit 111b was a ZigBee-enabled communication module. However, there are no restrictions on the configuration. For example, communication modules able to employ a wireless network called a Wireless Personal Area Network (WPAN) can be installed. Here, the range (several meters to several dozen meters) is narrower than a wireless LAN such as Wi-Fi or Ultra Wide Band (UWB). When communication units using two systems are combined, one should require less processing time for the initial settings than the other.

Configuration of the Second Embodiment

ZigBee, which is one close-range wireless communication standard, uses a 2.4 GHz frequency band, and data communication is performed using a communication channel selected from among the 16 allocated communication channels (CH0 through CH15). However, the 2.4 GHz band is a so-called "junk" band used by a wide variety of wireless communication systems. As a result, radio interference can occur with other wireless communication systems. When a wireless LAN is used onboard, and the wireless network between the cabin and the wireless device disposed on the outboard engine unit 10 is constructed using ZigBee, wireless communication is conducted using only the communication channel in the initial settings. Therefore, the system is susceptible to radio interference and reflected waves from other electronic devices such as network LAN devices and microwave ovens, and communication may be cut off. Under these conditions, the ability to properly receive, in the cabin, warnings of overheating and sensor malfunctions that are sent from the outboard engine unit has to be taken into account. In the second embodiment according to the present invention explained below, the maritime wireless communication system 1b is less susceptible to radio interference.

In the maritime wireless communication system 1b according to the second embodiment of the present invention, as shown in FIG. 6, a first wireless device 11 is disposed in an outboard engine unit 10, and a second wireless device 21 is disposed in the cabin in the same manner as the first embodiment. The first wireless device 11 installed in the outboard engine unit 10, and the second wireless device 21 disposed inside the cabin constitute a wireless communication system for performing data communication based on the ZigBee protocol. Any wireless device disposed in a given location of the watercraft 20 for relay purposes has been omitted from the drawing.

In addition to a control unit 110 and an RF unit 111, the first wireless device 11 includes a signal strength measuring unit 112. When the power has been turned on and before the engine in the outboard engine unit 10 has started, the signal strength measuring unit 112 measures the signal strengths of a plurality of previously allocated communication channels, and sends the results to the control unit 110. The control unit 110 compares the signal strengths measured by the signal strength measuring unit 112 to a predetermined signal strength threshold value, determines whether or not radio interference is being generated by another wireless device (not shown), switches to the next established communication channel when a measured signal strength lower than the signal strength threshold value indicates radio interference, and performs data communication. The RF unit 111 is a high-frequency circuit for communicating data generated by the control unit 110 according to the ZigBee protocol.

The outboard engine unit 10 includes a main body 12 of the outboard engine unit with an engine 121 at the core, and various types of sensors (51, 52, 54, 56 in FIG. 2) for detecting the operating conditions around the engine 121. The engine 121 is controlled by the ECU 122, and the ECU 122 is connected to the control unit 110 of the first wireless device 11 by wires for interprocessor communication.

In addition to a control unit 210 and an RF unit 211, the second wireless device 21 in the console unit 20a disposed in the cabin of the watercraft 20 includes a signal strength measuring unit 212 similar to the first wireless device 11. When the second wireless device 21 is started up, the control unit 210 compares the signal strengths measured by the signal strength measuring unit 212 to a predetermined signal strength threshold value, and determines whether or not any radio interference is being generated by another wireless device. When a measured signal strength lower than the signal strength threshold value indicates radio interference, the control unit switches to the next established communication channel, and performs data communication. The control unit 210 also supplies the engine information received via the RF unit 211 to the display 222 via the CAN bus 30, and the operation information transferred from the remote controller 221 disposed in the input/output device 22 via the CAN bus 30 is sent to the RF unit 211 in the wireless device 11 of the outboard engine unit 10 via the RF unit 212.

The input/output device 22 includes the remote controller 211, and the display 222 on which the various measurements are displayed. Both are connected via the CAN bus 30 to the control unit 210 of the second wireless device 21. The remote controller 221 has an ignition key for starting the engine 121 in the outboard engine unit 12, a steering switch for inputting steering instructions, a shift/throttle switch for inputting shift change and speed increase/decrease instructions, an indicator indicating the shift position, and a power tilt/trim switch for inputting tilt angle and trim angle adjustment instructions.

Operation of the Second Embodiment

Figure 7:
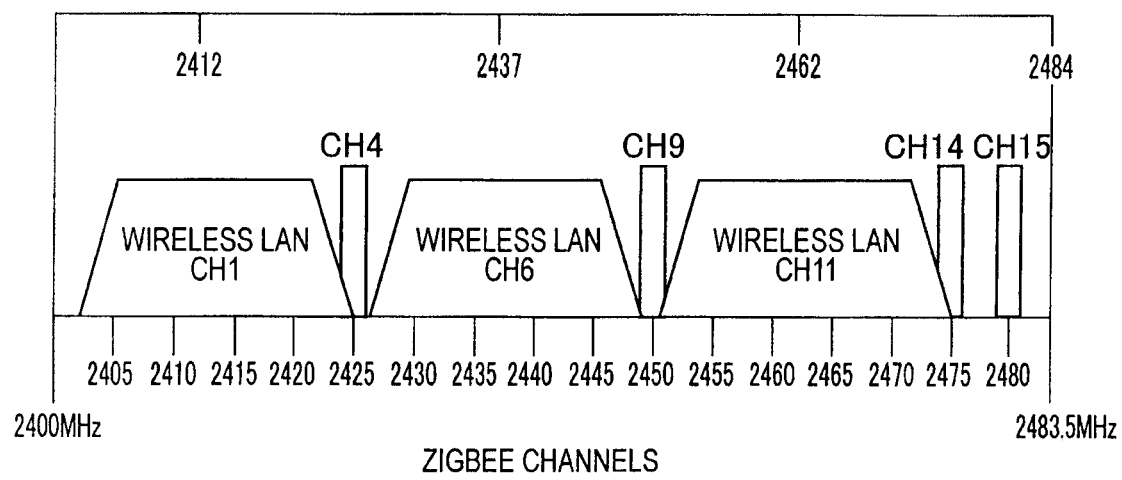
FIG. 7 is a block diagram showing communication channels used by the marine wireless communication system according to the second embodiment of the present invention.

The number of channels that can be configured by a wireless LAN device (IEEE802.11b/g) is four under the IEEE802.11b standard, and 13 under the IEEE802.11g standard. In Japan and North America, the recommended default is the use of communication channels CH1, CH6 and CH11. Therefore, as shown in the communication channel configuration in FIG. 7, in the ZigBee protocol used in this embodiment, communication channels CH4, CH9, CH14, CH15 are allocated and used in the 2.4 GHz band (from 2400 MHz to 2483.5 MHz) to avoid overlapping with other wireless communication systems such as wireless LAN.

Therefore, in the maritime wireless communication system 1b according to the second embodiment, the signal strengths of the communication channels are successively established before the engine starts up, and the measured signal strengths are compared to a predetermined signal strength threshold value to determine whether or not there is any radio interference and reflected waves from other electronic devices such as network LAN devices and microwave ovens. As a result, the system switches to the next established communication channel, and data communication is performed.

Figure 8:
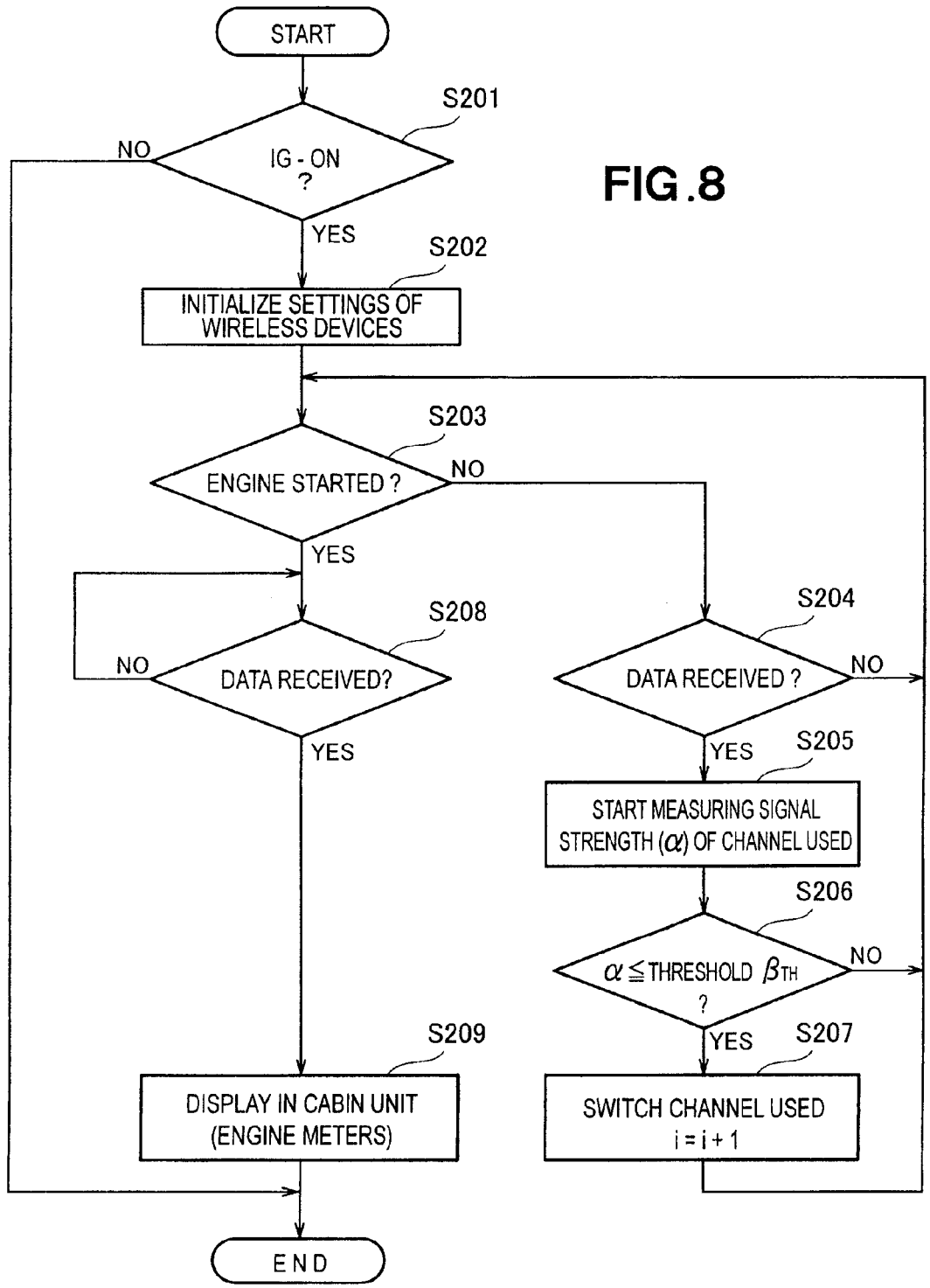
FIG. 8 is a flowchart showing an operation of the marine wireless communication system according to the second embodiment of the present invention.

The following is a detailed explanation of the operations performed by the maritime wireless communication system 1b according to the second embodiment shown in FIG. 6 with reference to FIG. 8 through FIG. 10.

As shown in the flowchart of FIG. 8, first, the control unit 110 in the first wireless device 11 built into the outboard engine unit 10 determines via the ECU 122 whether or not the ignition key in the vehicle has been turned ON (Step S201). When this has occurred, the wireless device 11 is initialized (Step S202). The operations of the first wireless device 11 in the second embodiment will be explained in a manner that avoids repetition since they are similar to those of the wireless device 21 installed in the console unit 20a of the watercraft 20. Here, initialization means successively setting the communication channels CH4, CH9, CH14, CH15 allocated to the ZigBee protocol. Here, the channel scanning process allocates communication channels with signal strength below a signal strength threshold value as valid communication channels.

In performing the initial settings, the control unit 110 first performs start detection on the engine 121 (Step S203). In start detection for the engine 121, the engine speed obtained from the ECU 122 is monitored by the control unit 110 via interprocessor communication when the ignition switch on the remote controller 221 has been switched on by the operator. In other words, when the engine speed is 0 and the watercraft 20 has stopped (NO in Step S203), the control unit 110 starts to measure the signal strength of the communication channels set by the signal strength measuring unit 112 based on data received from the radio device 21 via the RF unit 111 (YES in Step S204). Here, the previously set communication channel (i) is selected from among CH4, CH9, CH14, and CH15.

The signal strength measuring unit 112 starts the signal strength measuring operation in accordance with the start instruction from the control unit 110 (Step S205), and the measured signal strength $\alpha$ is outputted to the control unit 110. Once received, the control unit 110 compares the signal strength a received by the previously set communication channel (e.g., i=CH4) to a predetermined signal strength threshold value $\beta$TH (Step S206).

FIG. 9 shows observed examples in table format of the signal strengths of the various communication channels used by wireless LAN devices (−15 dBm through −95 dBm) and the communication error rate for each communication channel. These are used to establish the signal strength threshold value $\beta$TH. The former is (a) and the latter is (b).

As shown in FIG. 9, the packet error rate for ZigBee is greater than 25% using communication CH5 through CH8, because the signal strength of the wireless LAN devices exceeds −55 dBm. This error rate is high compared to the packet error rate for the other communication channels. In the second embodiment, the signal strength threshold value is set at −55 dBm. When the signals generated by the other wireless device fall below the signal strength threshold value, the presence of radio interference is recognized, and the system switches to another communication channel.

In other words, in the signal strength measurement start process in Step S205 of FIG. 8, when the measured signal strength a generated by another wireless device is lower than the signal strength threshold value $\beta$TH ($\alpha \leq \beta$TH) (YES in Step S206), radio interference is recognized, the system is switched to the next established communication channel (e.g., CH9) (Step S207), and the system returns to the engine startup determining process in Step S203. The same steps are repeated until the signals generated by another wireless device exceed the signal strength threshold value ($\alpha > \beta$TH) (NO in Step S206). In other words, the control unit 110 controls the signal strength measuring unit 112, and repeats the communication channel switching operation in Step S207 (i=i+1) until the absence of radio interference is recognized.

When the control unit 110 detects $\alpha > \beta$TH (NO in Step S206), the system returns to the engine startup determining process in Step S203. The detection of engine startup (YES in Step S203) ends the initialization of the wireless device 11 (channel scan process), and the system awaits the reception of data from the wireless device 21 via the RF unit 111 (Step S208).

When data is received by the RF unit 111 from the wireless device 21 (YES in Step S208), the control unit 110 generates display data based on the received data, and sends data (e.g., engine measurements such as speed) to the wireless device 21 via the RF unit 112 for display (Step S209). The display data sent by the wireless device 11 is received by the wireless device 21 via the RF unit 212, and the data is displayed on the display 222 of the input/output device 22 via the control unit 210, and the CAN bus 30.

FIG. 10 shows the observed waveforms for the RF signals before and after the communication channel switching mentioned above. FIG. 10(a) is the RF signal waveform when radio interference occurs in the wireless LAN before channel switching, and FIG. 10(b) is the RF signal waveform after the elimination of radio interference via channel switching. Here, A and B are the RF signals of a communication channel used with the ZigBee protocol, and the level indicated by the dotted line is the signal strength threshold value βTH set for the communication channel switching operation. It is clear from FIG. 10 that stable communication can be established in the initial setting process before getting underway by automatically switching to a communication channel that is hardly affected by radio interference, even when a wireless LAN device is causing radio interference during communication. Because the processing time required to measure the signal strength of an established communication channel is approximately 5 ms, the time required to perform wireless communication processing on data obtained from the outboard engine unit 10 while underway can be reduced by measuring the signal strength and switching communication channels when engine startup is determined by detecting the engine speed.

Advantageous Effect of the Second Embodiment

As explained above, the marine wireless communication system 1b according to the second embodiment of the present invention can be automatically switched to a communication channel with very little radio interference even when radio interference occurs due to a wireless device using the same frequency band. This can ensure stable communication before getting underway. As a result, the system is less susceptible to radio interference due to undesirable signals and reflected signals from other wireless devices, and situations can be avoided in which warnings sent by the outboard engine unit such as overheating and sensor malfunction warnings cannot be received.

Because the second embodiment prevents the measurement of the signal strength of communication channels and the switching of communication channels after the start of an engine in an outboard engine unit has been detected, and does not perform signal strength measurements and communication channel switching after an engine has started, the processing speed required for communication between an outboard engine and the cabin is reduced when the watercraft is underway.

In the second embodiment, one-way communication from the first wireless device 11 to the second wireless device 12 was explained. However, transmission of operational information, and the like from the [second] wireless device 21 to the [first] wireless device 11 can also be achieved using the same principles.

Configuration of the Third Embodiment

Because wireless devices are disposed for each outboard engine unit in the first and second embodiments, two or more wireless devices per outboard engine unit are required when two or more outboard engine units 10 are disposed in a so-called multiunit array and affixed to the stern of the watercraft 20. Preferably, one or more wireless devices for communicating with the outboard engine units 10 are also disposed in a console unit 20a. In this arrangement, communication counterparts are searched by mutual authentication between wireless devices before starting data communication. For example, when a four-unit configuration of outboard engine units 10 is disposed in a watercraft and two wireless devices are mounted in the console unit 20a, communication counterparts are specified between the two wireless devices for the console unit 20a to avoid radio interference between the four wireless devices disposed for each outboard engine unit 10. This is achieved by the manufacturer or the dealer writing the communication counterparts in the ROM of a control microprocessor housed in each wireless device prior to shipping of the product. Therefore, an operation to change the configuration settings is required to overwrite the content of the ROM of the control microprocessor when replacing or adding one or more outboard engine units in a multiunit array at a later date. This has necessitated either collecting the outboard engine unit with the wireless communication system from the user to modify the configuration settings, or having a maintenance worker visit the user bringing a dedicated diagnostic device to reconfigure the configuration settings. A great burden is accordingly placed on the maintenance worker or the user, leading to a demand for the development of a wireless communication system capable of reducing the steps required for the initial settings of a wireless device and reducing the burden on maintenance workers and users.

Figure 11:
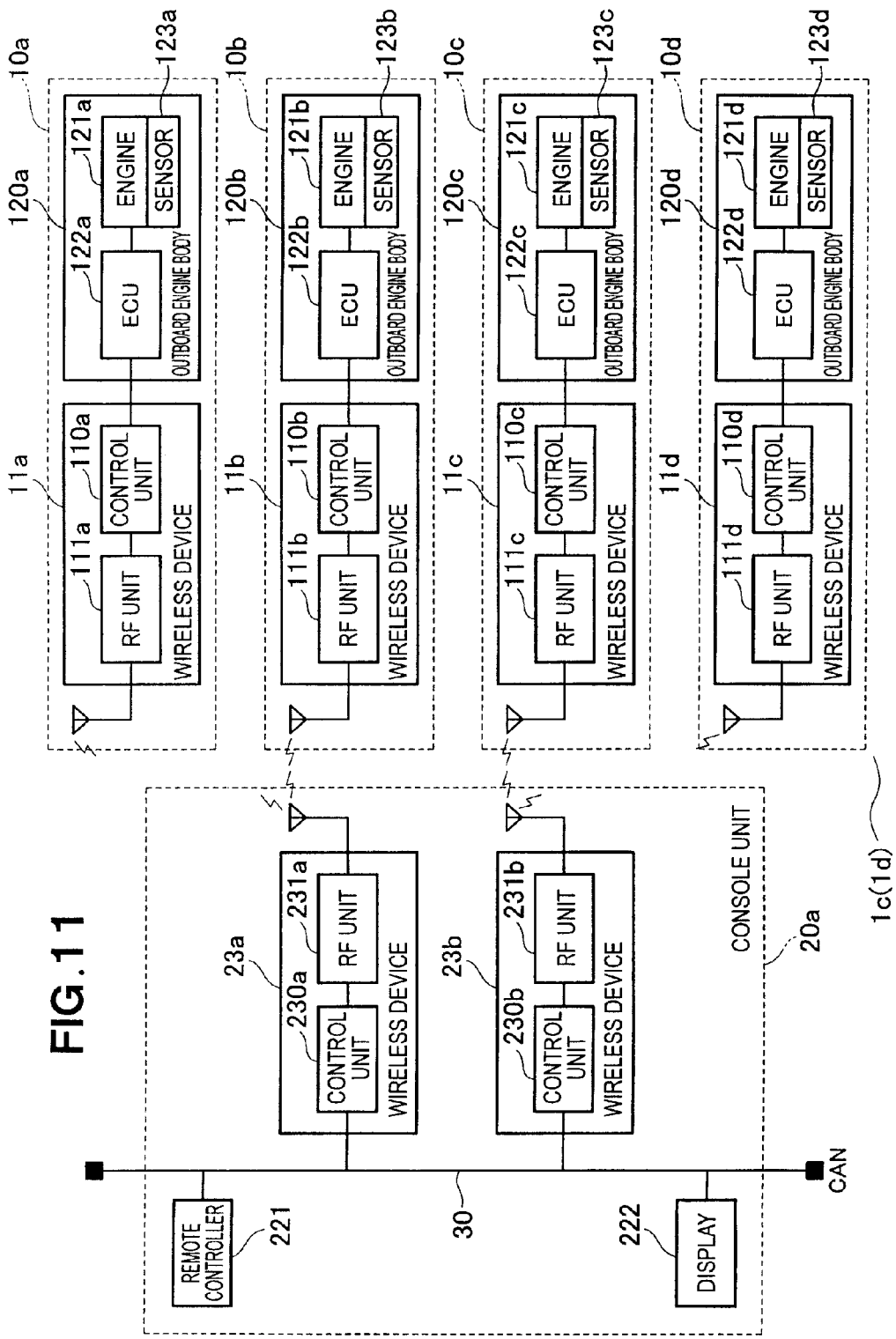
FIG. 11 is a block diagram showing a marine wireless communication system according to a third embodiment of the present invention.

As shown in FIG. 11, a wireless communication system 1c according to a third embodiment of the present invention (described hereinafter) comprises first wireless devices 11a to 11d disposed in individual outboard engine units 10 in a multiunit array, and second wireless devices 23a, 23b disposed in the console unit 20a in the cabin. The wireless devices 11a to 11d are mounted inside four outboard engine units 10a to 10d affixed to the stern of the watercraft 20, and the wireless devices 23a, 23b are disposed in the console unit 20a in the cabin of the watercraft 20.

The wireless devices 11a to 11d and the wireless devices 23a, 23b execute a mutual authentication procedure each time the engine of a wireless device 10a to 10d is detected to have started up, and communicate data between mutually authenticated wireless devices. This data communication will be described as conforming to a short-range wireless communication standard, such as ZigBee.

A remote controller 21 and a display 22 are connected to the console unit 20a through a CAN bus 30. The remote controller 21 remotely controls the outboard engine units 10 by the driver turning the ignition key or shifting gears. The display 22 displays an operating state, such as engine information, of outboard engine units 10 in a multiunit array. Thus, bidirectional data communication is executed between the wireless devices 23a, 23b in the console unit 20a, and the wireless devices 11a to 11d disposed in each of the outboard engine units 10 in the multiunit array.

As shown in FIG. 11, each of the outboard engine units 10a to 10d in a multiunit array includes a wireless device 11a to 11d and an outboard engine body 120a to 120d. The wireless device 11a comprises a control unit 110a and an RF unit 111a. The control unit 110a comprises a microprocessor, for example, and executes a mutual authentication procedure with the wireless devices 23a, 23b of a console unit 20a to be a communication counterpart before communication. The control unit 110a follows the configuration set by the mutual authentication to control the RF unit 111a on the basis of a communication protocol using, for example, ZigBee. The RF unit 111a operates as a communication unit for exchanging data applying the ZigBee protocol, and comprises a high frequency circuit in terms of hardware. The wireless devices 11b to 11d have the same configuration as the aforedescribed wireless device 11a, and will not be described separately for the sake of avoiding repetition.

The outboard engine body 120a comprises an engine 121a, an ECU 122a, and a sensor 123a. The engine 121a transmits power to, and causes the rotation of, a propeller 42 (see FIG. 1) under FI control by the ECU 122a to generate thrust for the watercraft 20. The engine 121a is a four-cycle gasoline engine. The ECU 122a exercises mainly FI control, and also has a function for acquiring engine information detected by the sensor 123a mounted in parts of the engine 121a and transmitting this information through the wireless device 11a to the console unit 20a. The ECU 122a is connected to the control unit 110a of the wireless device 11a by interprocessor communication through a wired serial data communication interface; e.g., UART.

The console unit 20a is disposed near the driver's seat of the watercraft 20. The remote controller 21, which is operated by the driver, and the display 22, which displays a variety of meters, are mounted on this console unit 20a. The remote controller 21 and the display 22 are the same as in the first and second embodiments, and will not be described again for the sake of avoiding repetition.

The wireless device 23a comprises a control unit 230a and an RF unit 231a. The control unit 230a comprises, e.g., a microprocessor, and executes a mutual authentication procedure before communicating with the wireless devices 11a to 11d mounted in the outboard engine unit 10 to be communication counterparts. The control unit 230a follows the configuration set by the mutual authentication to control the RF unit 231a on the basis of a communication protocol using, for example, ZigBee. The RF unit 231a operates as a communication unit for exchanging data applying the ZigBee protocol, and comprises a high frequency circuit in terms of hardware.

The wireless device 23b has the same configuration as the aforedescribed wireless device 23a, and will not be described separately for the sake of avoiding repetition. The wireless devices 23a, 23b are connected through the CAN bus 30 to the remote controller 21 and the display 22.

Operation of the Third Embodiment

Figure 12:
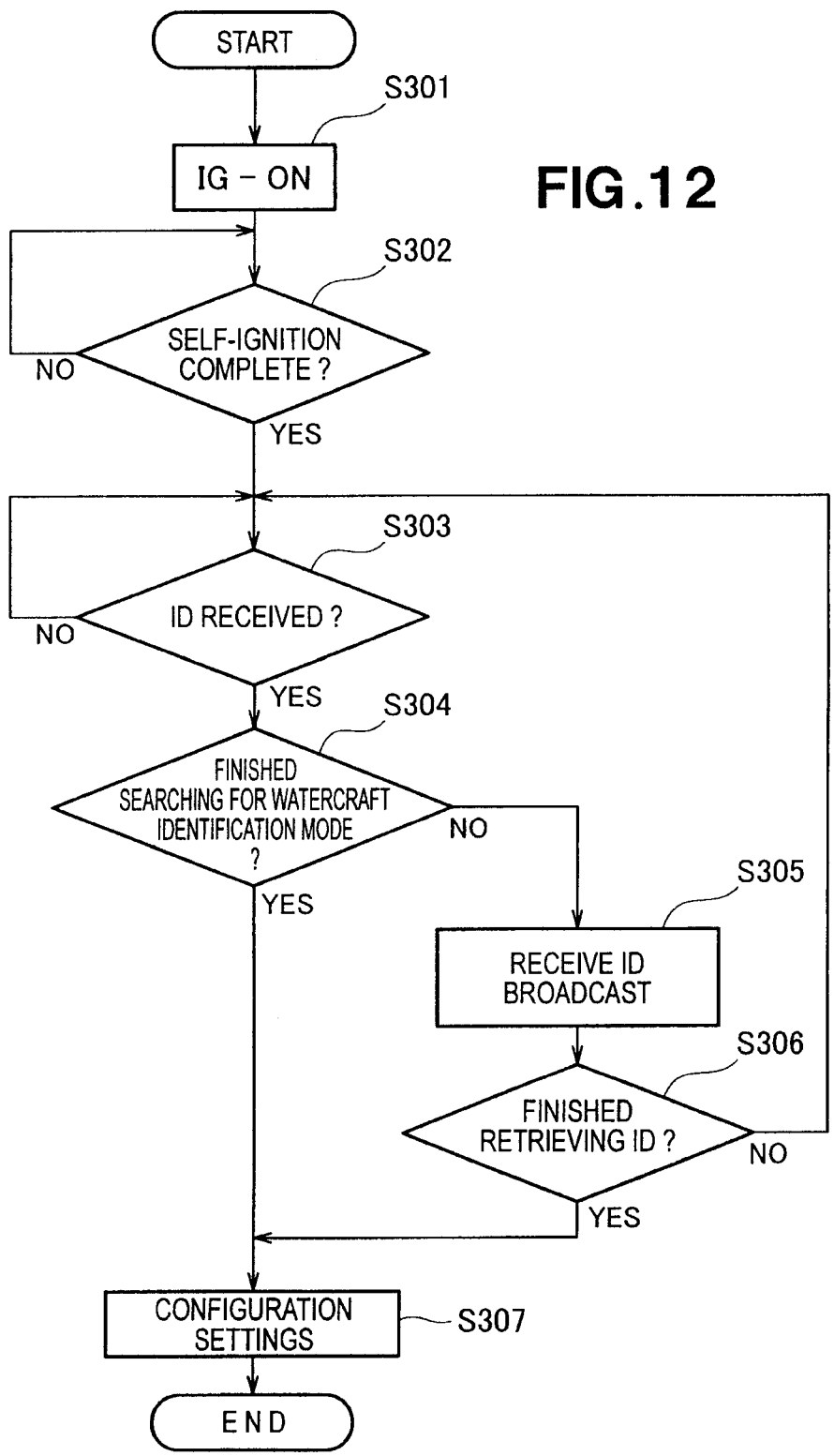
FIG. 12 is a flowchart showing an operation of the marine wireless communication system according to the third embodiment of the present invention.

Next, the operation of the wireless communication system for watercraft 1c according to the third embodiment of the present invention shown in FIG. 11 will be described in detail with reference to the flowchart of FIG. 12.

First, the driver turns on the ignition key of a remote controller 221 disposed on the console unit 20a (IG-ON). When this is detected by the ECUs 122a to 122d of the outboard engine units 120a to 120d through the wireless devices 23a, 23b and the wireless devices 11a to 11d housed in the outboard engine unit 10 (step S301 "YES"), the ECUs 122a to 122d accordingly provide notification to the control units 110a to 110d of the wireless devices 11a to 11d by interprocessor communication.

Next, the ECUs 122a to 122d monitor the speed of the engines 121a to 121d through the sensors 123a to 123d (step S302), detect that all engines have finished starting up (once self-ignition is complete) at a timing greater than a predetermined speed (step S302 "YES"), and notify the console unit 20a through the wireless devices 11a to 11d that the engines have started up.

On having been notified that the engines have started up, the control units 230a, 230b of the wireless devices 23a, 23b in the console unit 20a receive individual information required to set configuration settings regarding identification information (ID) and sending/receiving attributes allocated in advance to each of the outboard engine units 10 (to each of the wireless devices) from each of the wireless devices 11a to 11d of the outboard engine units 10. Upon receiving information regarding identification information and sending/receiving attributes from any of the wireless devices 11a to 11d of the outboard engine units 10 (step S303 "YES"), the control units 230a, 230b determine whether an "outboard engine unit identification mode search procedure" has ended.

This "outboard engine unit identification mode search" procedure is a procedure in which the control units 230a, 230b of the wireless devices 23a, 23b disposed in the console unit 20a simultaneously send the information regarding identification information and sending/receiving attributes allocated to their units, for example, by a broadcast divided into sixteen channels usable by ZigBee; and acquire from all of the wireless devices 11a to 11d that will be communication counterparts the information regarding the IDs and sending/receiving attributes of the wireless devices 11a to 11d as required to set configuration settings.

If the outboard engine unit identification mode search procedure has ended (step S304 "YES"), the control units 230a, 230b of the wireless devices 23a, 23b in the console unit 20a set configuration settings specifying communication counterparts between the wireless device 23a (23b) in question and the wireless devices 11a to 11d disposed in the outboard engine units 10, create a configuration file, and end the aforedescribed series of procedures (step S307). Thereafter, data are sent and received between the specified wireless devices according to the created configuration file.

If the outboard engine unit identification mode search procedure has not ended (step S304 "NO"), the control units 230a, 230b of the wireless devices 23a, 23b in the console unit 20a simultaneously send the information regarding identification information and sending and receiving attributes allocated to their units, for example, by a broadcast divided into sixteen channels usable by ZigBee (step S305). The control units then stand by until information regarding the IDs and sending/receiving attributes has been acquired from all of the wireless devices 11a to 11d disposed in the outboard engine units 10 in a multiunit array (step S306 "YES") and receive the IDs and sending/receiving attributes.

According to this embodiment, the control units 230 of the wireless devices 23a, 23b disposed in the console unit 20a are the primary units that execute an authentication operation to set initial settings with the wireless devices 11a to 11d disposed in outboard engine units 10 in a multiunit array. The wireless devices 11a to 11d disposed in outboard engine units 10 in a multiunit array, however, may simultaneously be the primary units that execute an authentication operation to set initial settings with the wireless devices 23a, 23b disposed in the console unit 20a.

Advantageous Effect of the Third Embodiment

According to the wireless communication system for watercraft 1c of the third embodiment of the present invention described above, upon detecting that the engines of the outboard engine units 10a to 10d have started, the wireless device 23a (23b) of the console unit 20a executes a mutual authentication procedure with the wireless devices 11a to 11d disposed in the outboard engine units 10a to 10d, and communicates data with the wireless devices 11a to 11d with which mutual authentication has been established. Therefore, entering the initial settings for specifying a communication counterpart is automated, and configuration settings can be changed without requiring a third party when changing or adding outboard engine units 10a to 10d. Therefore, the number of steps required during initialization can be reduced, and the burden placed on maintenance personnel and users can be lessened.

According to the third embodiment, the wireless device 23a (23b) of the console unit 20a executes a mutual authentication procedure each time that starting of the engines of the outboard engine units 10a to 10d is detected. Therefore, the system architecture is a flexible architecture in which initial settings for specifying a communication counterpart are automatically set each time that starting of the engines is detected, and an outboard engine unit can be replaced or added without requiring a third party.

According to the third embodiment, during mutual authentication, the wireless device 23a (23b) of the console unit 20a simultaneously sends individual information required for mutual authentication to all of the wireless devices 11a to 11d disposed in the outboard engine units 10a to 10d. Therefore, the wireless devices 11a to 11d receiving the individual information of the wireless devices 23a, 23b can specify a communication counterpart merely by sending the associated individual information to the wireless devices 23a, 23b with which communication is desired after communication is cut off.

According to the third embodiment, upon receiving individual information from the wireless devices 11a to 11d disposed in the outboard engine units 10a to 10d, the wireless device 23a (23b) of the console unit 20a confirms that the individual information of the wireless device 23a (23b) required for mutual authentication has been simultaneously sent to all of the wireless devices 11a to 11d, whereupon configuration-setting with the wireless devices 11a to 11d that will be communication counterparts is performed. Therefore, configuration-setting is performed automatically during initialization, and the configuration can be changed without requiring a third party when restoring communication after being cut off, when reconstructing a communication network in association with a changing of the configuration, or at other times. Therefore, the number of steps required during configuration can be reduced, and the burden placed on maintenance personnel and users can be lessened.

Configuration of the Fourth Embodiment

The outboard engine unit 10 is sold separately from the watercraft 20, and rigged in the watercraft 20 together with a variety of equipment. Specifically, wirably connecting outboard engine units 10 in a multiunit array, as described in the third embodiment, to the console unit 20a requires laying, for example, a CAN (control area network) cable, or a harness comprising a signal line, a power source, and a ground wire. According to the third embodiment, wireless devices are mounted in each of four outboard engine units 10 and in the console unit 20a, and engine information detected by, for example, sensors (not shown), or information on operations performed by a remote controller is exchanged by data communication between these wireless devices. However, the wireless devices must be connected to each of the two or more outboard engine units 10 by harnesses if one-to-one communication is to be provided between two or more (in this case, four) outboard engine units 10 and the console unit 20a using the same communication channel frequency. This task occurs when one-to-one communication is performed over the same communication channel. Rigging is often needed despite the fact that the communication is performed wirelessly, and the outboard engine units 10 can often be adversely affected depending on the way that the harnesses are laid. The strategy of connecting a wireless device to each outboard engine unit 10 in a multiunit array or each console unit 20a (remote controller 221 and display 222) may be considered to minimize the number of harnesses connected, but by using the same communication channel, this arrangement causes (communication) collisions, which destabilizes communication and can make normal communication impossible. This arrangement can also cause communication delay.

Therefore, according to the fourth embodiment of the present invention to be described hereinafter, a wireless communication system for watercraft 1d for data communication between outboard engine units 10 in a multiunit array and the cabin (console unit 20a) of the watercraft 20 precludes the use of redundant communication channels when sending and receiving engine information, averts collision between wireless devices so that stable communication is achieved, and dispenses with superfluous rigging tasks. As with the third embodiment described earlier, the fourth embodiment, to be described in detail hereinafter, uses the configuration shown in FIG. 11.

Operation of the Fourth Embodiment

Next, the operation of the wireless communication system 1d according to the fourth embodiment of the present invention will be described in detail with reference to the flowchart of FIG. 13 and the timing chart of FIG. 14.

Figure 13:
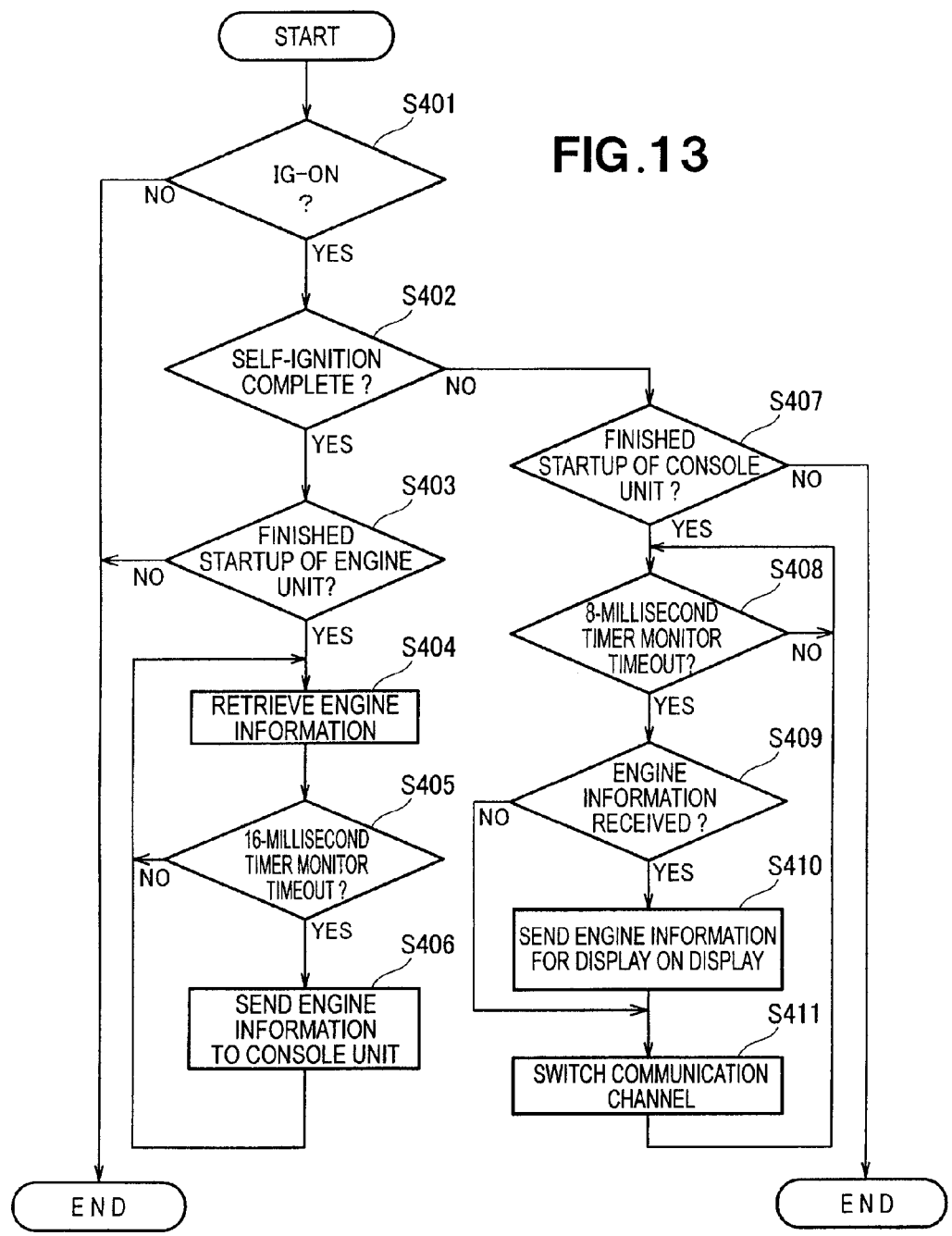
FIG. 13 is a flowchart showing an operation of the marine wireless communication system according to a fourth embodiment of the present invention.
Figure 14:
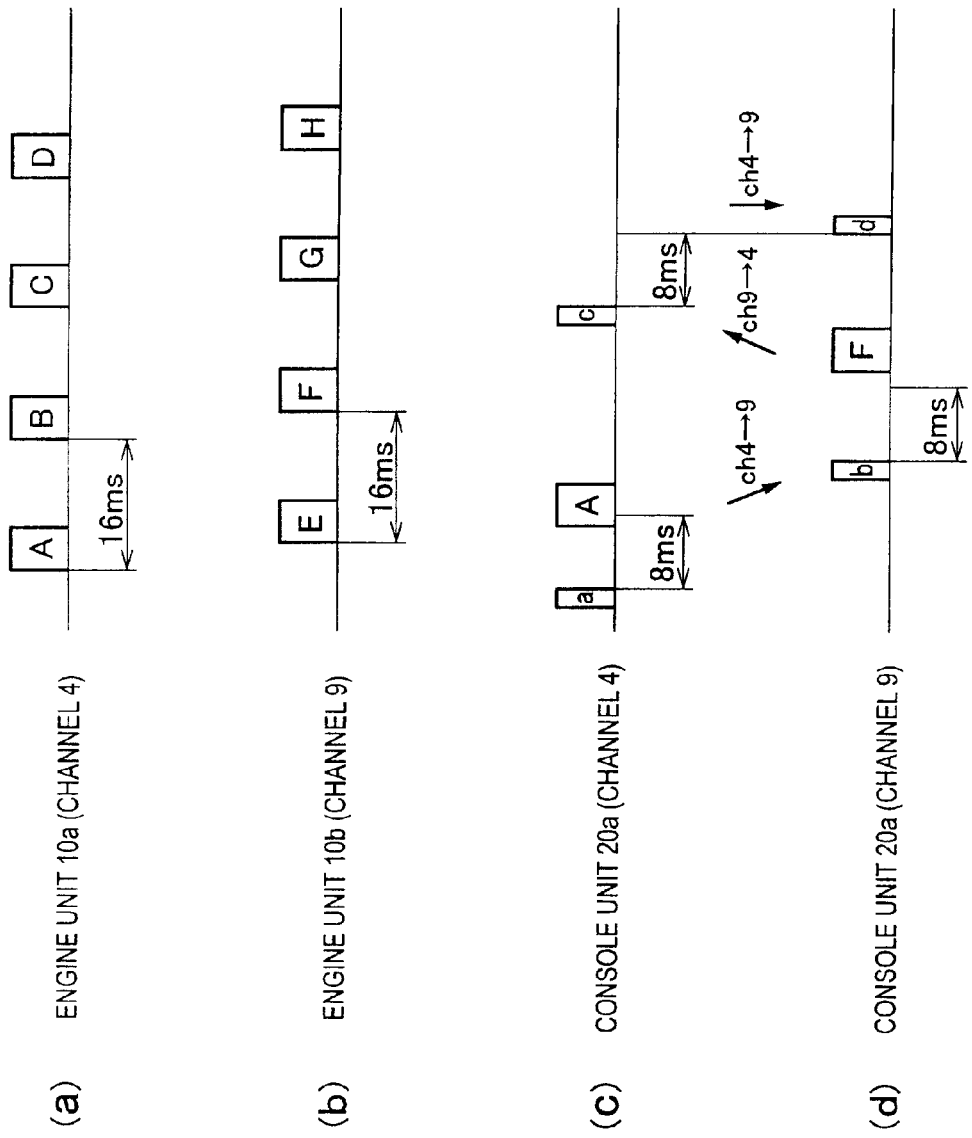
FIG. 14 is a timing chart showing an operation of the marine wireless communication system according to the fourth embodiment of the present invention.

In FIG. 13, first, the driver turns on the ignition key of a remote controller 221 disposed on the console unit 20a (IG-ON). When this is detected by the ECUs 122a to 122d of the outboard engine unit bodies 120a to 120d through the wireless devices 23a, 23b and the wireless devices 11a to 11d housed in the outboard engine unit 10 (step S401 "YES"), the ECUs 122a to 122d accordingly send notification to the control units 110a to 110d of the wireless devices 11a to 11d using interprocessor communication. Next, the ECUs 122a to 122d monitor the speed of the engines 121a to 121d through the sensors 123a to 123d, detect that all engines have finished starting up (once self-ignition is complete) at a timing greater than a predetermined speed (step S402 "YES"), and notify the console unit 20a through the wireless devices 11a to 11d that the engines have started.

When notified that the engines have started (step S402 "YES"), the wireless devices 11a to 11d of the outboard engine unit 10 start up, and the control units 110a to 110d start operating to initialize settings. "Initializing settings" refers to a procedure for configuring a communication channel allocated in advance, configuring individual identification information (ID) for the wireless devices 23a, 23b in the console unit 20a to be communication counterparts, and starting an onboard 16-ms interrupt timer.

Next, when the initialization of the wireless devices 11a to 11d has concluded, and the engines 121a to 121d have started up (step S403 "YES"), the control units 110a to 110d retrieve, using interprocessor communication, the engine speed and other engine information acquired from the ECUs 122a to 122d through the sensors 123a to 123d (step S404). The engine information retrieved at this time includes, for example, information regarding the speed indicated by a remote controller 211, and the battery voltage.

Next, the control units 110a to 110d monitor the 16-ms interrupt timer, and send the retrieved engine information to the console unit 20a through the RF unit 111a (step S406) each time that a timeout is detected (step S405 "YES"). Thus, the retrieved engine information is sent to the console unit 20a each time that a 16-ms timeout is detected.

If the engine speed does not satisfy a predetermined speed during the determination of engine starting in step S402 (step S402 "NO"), the wireless device 23a or 23b in the console unit 20a starts up, and the control unit 230a or 230b initializes settings. "initializing settings" refers to a procedure for configuring a communication channel allocated in advance, configuring individual identification information (ID) for each outboard engine unit 10 to be a communication counterpart, and starting an inbuilt 8-ms interrupt timer.

For example, if initializing of the wireless device 23a has concluded and the console unit 20a has started up (step S407 "YES"), the control unit 230a monitors the timeouts of the 8-ms interrupt timer (step S408). Each time that a timeout of the 8-ms interrupt timer is detected (step S408 "YES"), the control unit 230a determines whether engine information has been received from the engines 121a to 121d during this 8-ms interval (step S409). The presence of an interrupt is used to determine whether engine information has been received.

The engine information received during this 8-ms interval is used to reconstruct data by a data procedure for display on the display 222, and transmitted to the display 222 through the CAN bus 30 (step S410). Next, the control unit 230a switches the communication channel (step S411), returns to the procedure of step S408 for determining a timeout of the 8-ms interrupt timer, and repeats the sequence of determining whether engine information has been received (step S409), processing and transmitting the received engine information (step S410), and switching the communication channel (step S411).

However, if engine information has not been received during the 8-ms interval (step S409 "NO"), the control unit 230a immediately switches the communication channel (step S411); returns to the procedure for monitoring the timeouts of the 8-ms interrupt timer in step S408; and repeats the sequence of determining whether engine information has been received (step S409), processing and transmitting the received engine information (step S410), and switching the communication channel (step S411).

Next, the procedure for switching the communication channel in step S411 will be described in detail with reference to the timing chart of FIG. 14. To simplify the description, FIG. 14 shows the flow of signals between the console unit 20a and two outboard engine units 10a, 10b in a multiunit array for the outboard engine units 10 on a time axis.

First, it is assumed that, of the sixteen communication channels, CH4 was allocated to the engine 121a and CH9 was allocated to the engine 121b as part of the configuration during the initializing procedure at startup. Therefore, engine information A, B, C, and D detected by inbuilt sensors for the engine 121a is sent to the console unit 20a at 16-ms intervals using the frequency of CH4. Likewise, the engine information E, F, G, and H detected by inbuilt sensors for the engine 121b is sent to the console unit 20a at 16-ms intervals using the frequency of CH9.

It is also assumed that the engine 121a on CH4 used as a communication counterpart and the engine 121b on CH9 used as a communication counterpart are allocated to the console unit 20a during the initializing procedure at startup. Therefore, the console unit 20a starts the 8-ms timer on the basis of a channel switching signal a during startup, and stands by to receive the CH4 engine information from the engine 121a. If the engine information A has been received within 8 ms, the console unit 20a retrieves this engine information A, then generates a channel switching signal b to switch the communication channel from CH4 to CH9. The console unit then stands by to receive the engine information F from the engine 121b, and if unable to receive the engine information F within 8 ms, immediately switches the communication channel to be allocated from CH9 to CH4 using a channel switching signal c, and stands by to receive engine information from the engine 121a. The same operation is repeated thereafter.

Thus, in the case of a two-unit array of outboard engine units 10, collision between sent and received engine information can be eliminated to produce stable communication by allocating communication channels to each of the engines 121a, 121b of these outboard engine units, using these communication channels to send engine information to the console unit 20a, and having the console unit 20a switch these communication channels in sequence to receive the engine information sent by the engines 121a, 121b.

According to this embodiment, a description has only been provided for a unidirectional operation for sending engine information from outboard engine units 10 in a multiunit array toward the console unit 20a. However, collision between operating information can similarly be eliminated to produce stable communication when sending bidirectionally from the console unit 20a toward the outboard engine units 10. Although this embodiment was described for two outboard engine units 10 in a multiunit array, four (as shown in FIG. 11) or more outboard engine units may be arrayed. Although the description related to there being two wireless devices disposed in the console unit 20a, a plurality of wireless devices may be disposed in any combination; e.g., disposing separate wireless devices for the remote controller 221 and the display 222.

Advantageous Effect of the Fourth Embodiment

According to the wireless communication system for watercraft 1d of the fourth embodiment of the present invention described above, the engines 121a, 121b (first wireless devices 11a and 11b) use a communication channel preallocated to each of the outboard engine units 10 to send engine information outputted by the sensor 123, and the console unit 20a (second wireless device 23a) switches the communication channel in sequence to receive engine information and process the received engine information. Therefore, collisions of engine information between the wireless devices 11a, 11b, and 23a can be avoided without duplicating the communication channels used when sending and receiving the engine information, allowing communication to be stabilized. Moreover, superfluous rigging tasks are obviated because the need to allow for one-to-one communication is eliminated.

According to this embodiment, the engines 121a, 121b (wireless devices 11a, 11b) use separate preset communication channels to send engine information at a 16-ms period (first period), and the console unit 20a (wireless device 23a) determines whether engine information has been received at an 8-ms period (second period), which is shorter than the first cycle. If the information has been received, the console unit 20a processes the received engine information before switching the communication channel, whereas if the information has not been received, the console unit immediately switches the communication channel. Therefore, stable, collision-free 1:n communication can be achieved by utilizing the difference in periods, where an allocated communication channel is used to send data on one side, and the communication channel is switched to receive data on the other side.

Configuration of the Fifth Embodiment

Research and development has recently been performed into marine intelligent transportation systems (ITS) allowing an inter-craft communication system to be achieved oriented towards safe enjoyment of watercraft. There are known inter-craft transportation systems enabling communication over waterways without interruption, such systems having a network constructed from wireless access points arranged in a grid to form multi-hops as the underlying technology. Applying such systems to watercraft, when a communication system for monitoring the operating state of outboard engine units is combined with an inter-craft communication system for wireless communication with other watercraft to achieve a unified wireless communication system, the resulting system is complicated to control and has a complex system architecture.

Therefore, the fifth embodiment of the present invention, to be described hereinafter, achieves a unified wireless communication system for monitoring, e.g., the operating state of outboard engine units and position information between watercraft, and provides a technology for assuring highly reliable wireless communication.

Figure 15:
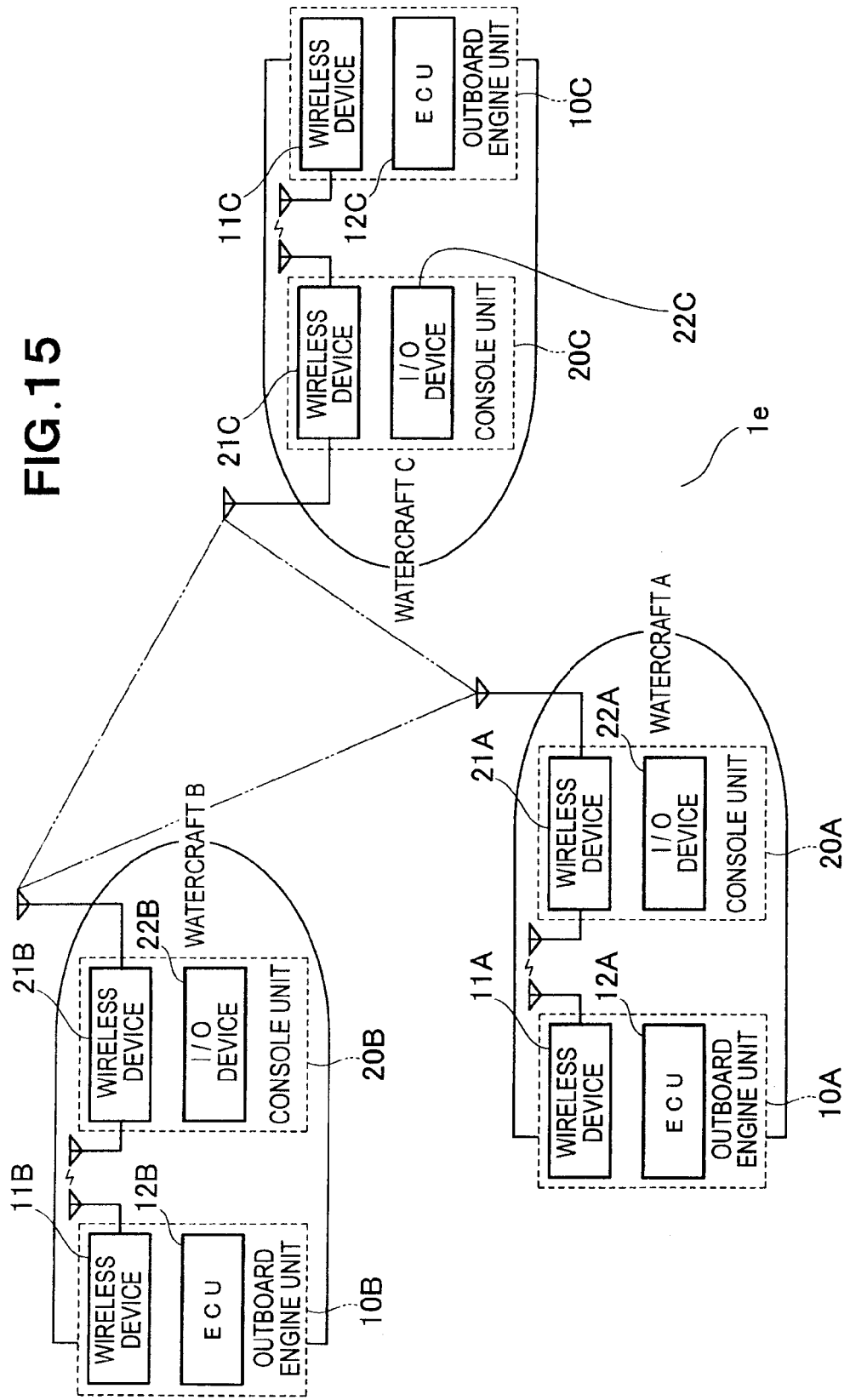
FIG. 15 is a diagrammatical view showing a marine wireless communication system according to a fifth embodiment of the present invention.

A wireless communication system for watercraft 1e according to the fifth embodiment of the present invention is achieved, for example, by constructing a network between watercraft A to C as shown in FIG. 15. For example, looking at the watercraft B, the network constructed in the watercraft B has a configuration including a first wireless device (wireless device 11B) housed in an outboard engine unit 10B affixed to the stern, and a second wireless device (wireless device 21B) housed in a console unit 20B disposed in the cabin. The wireless device 11B communicates on the basis, e.g., of a first communication protocol for short-range wireless communication. The wireless device 21B, besides communicating on the basis of the first communication protocol, communicates on the basis, for example, of a second communication protocol that has a longer communication distance than the first protocol; e.g., for middle- and long-range wireless communication with other watercraft capable of communicating on the basis of the second communication protocol. That is, the wireless device 21B, besides short-range wireless communication within the watercraft, also uses middle- and long-range wireless communication with other cabins A and C.

The "first communication protocol" refers to a short-range wireless communication protocol using, for example, ZigBee® based on IEEE 802.15.4, Bluetooth® based on IEEE 802.15.1, or UWB (ultra-wideband) based on IEEE 802.15.3a; and is used in a range of several meters to several tens of meters, which is a shorter communication range than a wireless LAN (local area network). The "second communication protocol" assumes the use of a wireless MAN (metropolitan area network) covering a middle- to long-range area and having a communication range of 1 km or greater; for example, WiMAX (worldwide interoperability for microwave access) based on IEEE 802.16e.

The watercraft A and C have 10A, 10C, 20A, 20C, which are similar to the outboard engine unit 10B and the console unit 20B on the watercraft B described above, which have the same internal configuration and will not be described again for the sake of avoiding repetition.

Figure 16:
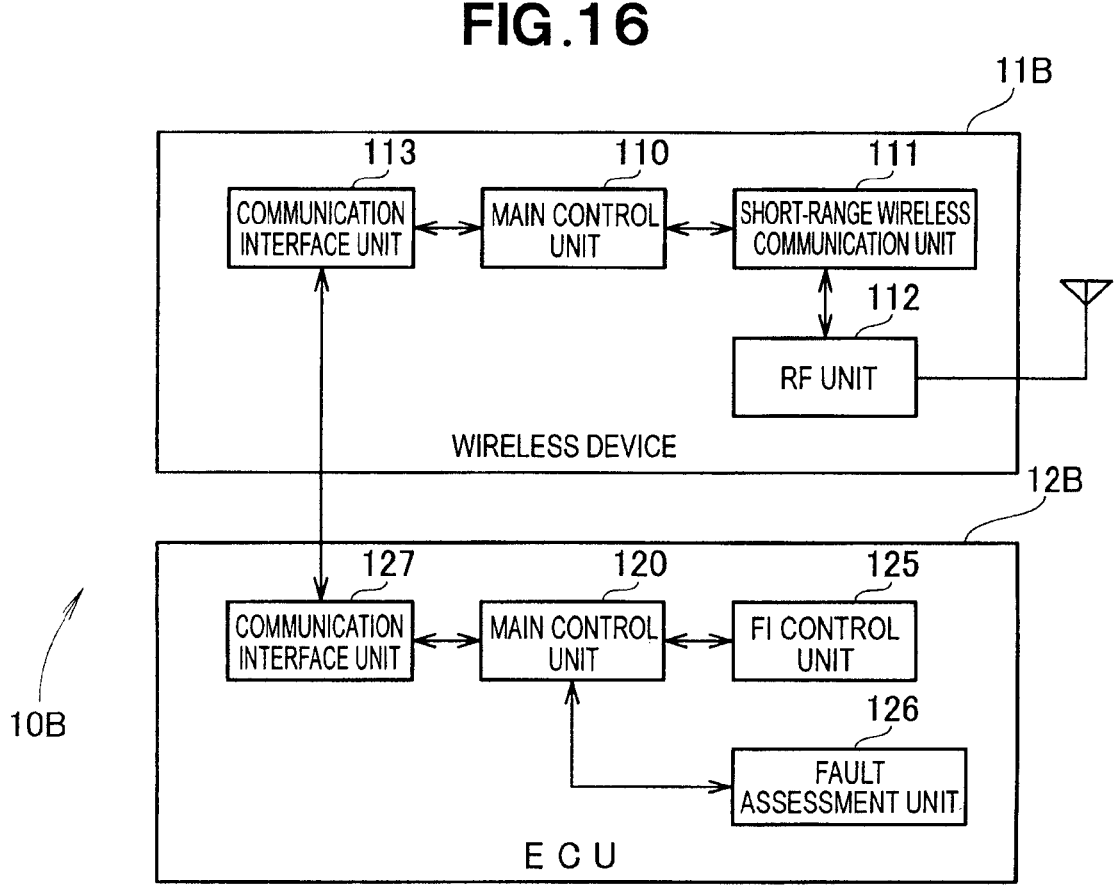
FIG. 16 is a block diagram showing a console unit shown in FIG. 15.
Figure 17:
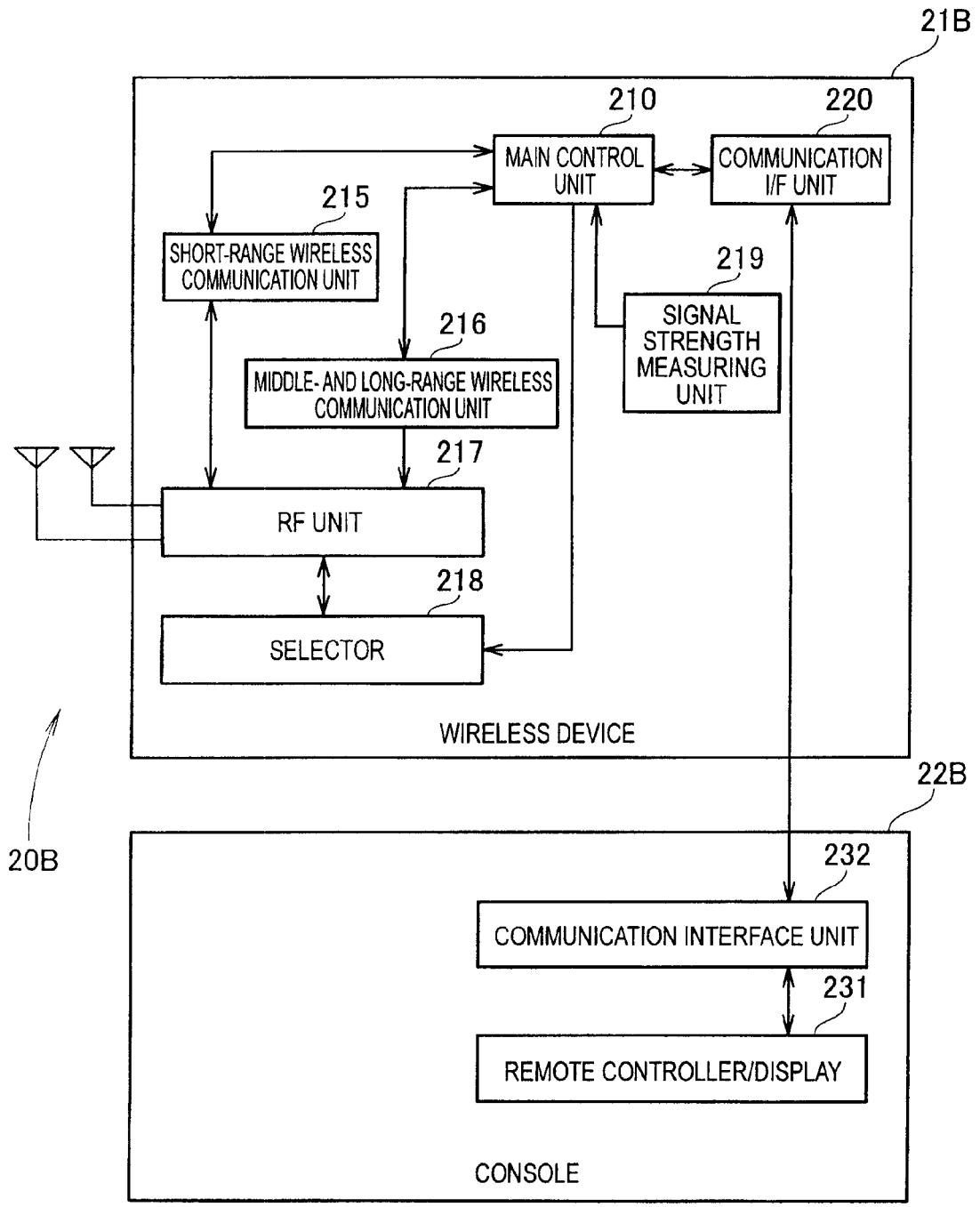
FIG. 17 is a block diagram showing an electrical system of an outboard engine unit shown in FIG. 15.

FIGS. 16 and 17 show only the electrical system of the outboard engine unit 10B (FIG. 16) and the console unit 20B (FIG. 17). As shown in FIG. 16, the outboard engine unit 10B includes the wireless device 11B and an ECU 12B. The wireless device 11B is mounted inside an engine cover (not shown), and communicates by short-range wireless communication with the wireless device 21B mounted in the console unit 20B. The ECU 12B is an electronic control unit for controlling the amount of fuel injected into the engine (not shown).

The wireless device 11B comprises a main control unit 110, a short-range wireless communication unit 111, an RF unit 112, and a communication interface unit 113. The short-range wireless communication unit 111 communicates on the basis of ZigBee, for example, so as to enable the wireless device 11B to communicate with the wireless device 21B mounted in the console unit 20B using a short-range wireless communication line. The RF unit 112 is a high frequency circuit for wirelessly communicating data generated by the main control unit 110 on the basis of ZigBee and under the control of the short-range wireless communication unit 111. The communication interface unit 113 forms a data transmission route during interprocessor communication with the ECU 12B, and comprises, for example, a UART.

The main control unit 110 comprises, for example, a microprocessor; and controls the sequence of the short-range wireless communication unit 111, the RF unit 112, and the communication interface unit 113 so that engine information acquired by the communication unit 111 from the ECU 12B through a sensor is sent to the console unit 20B by short-range wireless communication, or operating information acquired from the console unit 20B is sent to the engine through the ECU 12B.

The ECU 12B comprises a main control unit 120, an FI control unit 125, a fault assessment unit 126, and a communication interface unit 127. The FI control unit 125 controls the amount of fuel to be injected into the engine under the control of the main control unit 120. The fault assessment unit 126 assesses faults on the basis of detection information detected by sensors mounted inside the engine, and delivers the result to the main control unit 120. The communication interface unit 127 is a data transmission line for conducting interprocessor communication with the wireless device 11B, and comprises, for example, a UART.

The main control unit 120 comprises, e.g., a microprocessor. The ECU 12B controls the amount of fuel injected, and sequentially controls the FI control unit 125, the fault assessment unit 126, and the communication interface unit 127 so that either a recovery is performed on the basis of the fault assessment, or that engine information generated by sensor monitoring is sent to the console unit 20B through the wireless device 11B by interprocessor communication.

As shown in FIG. 17, the console unit 20B includes the wireless device 21B and an input/output device 22B. The wireless device 21B is mounted inside the console unit 20B, and communicates by short-range wireless communication with the wireless device 11B mounted in the outboard engine unit 10B, and by middle- and long-range wireless communication with the other watercraft B and C. The input/output device 22B includes a human interface 231 for monitoring and operating an outboard engine unit, which includes the display and remote controller indicated in the first to fourth embodiments, and is connected to the wireless device 21B through a communication interface unit 232.

The wireless device 21B comprises a main control unit 210, a short-range wireless communication unit 215, a middle- and long-range wireless communication unit 216, an RF unit 217, a selector 218, a signal strength measurement unit 219, and a communication interface unit 220. The short-range wireless communication unit 215 communicates on the basis of, for example, ZigBee so as to enable the wireless device 21B to communicate with the wireless device 11B mounted in the console unit 10B using a short-range wireless communication line. The middle- and long-range wireless communication unit 216 communicates on the basis of, for example, WiMAX, so as to enable the wireless device 21B to communicate with other watercraft using a middle- and long-range wireless communication line. The RF unit 217 is a high frequency circuit for wirelessly sending and receiving data generated by the main control unit 210 under the control of the short-range wireless communication unit 215 or the middle- and long-range wireless communication unit 216. The selector 218 is periodically monitored by the main control unit 210 to switch antennas and control input and output of data by short-range wireless communication and middle- and long-range wireless communication using the RF unit 217.

The signal strength measurement unit 219 measures the received signal strength indicator (RSSI) of a signal issued by another watercraft at fixed time intervals, and supplies the result to the main control unit 210. The communication interface unit 220 forms a data transmission route during interprocessor communication with the input/output device 22B, and comprises, for example, a UART.

Under periodic monitoring by an inbuilt monitoring timer, the main control unit 210, which comprises, e.g., a microprocessor, controls the short-range wireless communication unit 215 so that communication with the wireless device 11B mounted in the outboard engine unit 10B is performed using ZigBee, and controls the middle- and long-range wireless communication unit 216 so that communication with another watercraft is performed using WiMAX. The main control unit 210 also controls the short-range wireless communication unit 215 and the middle- and long-range wireless communication unit 216 to communicate in a short period with the cabin using ZigBee and with other watercraft using WiMAX. The main control unit 210 performs a control so as to communicate by WiMAX with other watercraft at the maximum RSSI measured by the signal strength measurement unit 219. To achieve this, the main control unit 210 controls the sequence of the short-range wireless communication unit 215, the middle- and long-range wireless communication unit 216, the RF unit 217, the selector 218, the signal strength measurement unit 219, and the communication interface unit 220.

The input/output device 22B is a remote controller for use by the driver to remotely control the operation of the outboard engine units, or a display for displaying engine information. The communication interface unit 232 forms a data transmission line when communicating with the wireless device 21B, and comprises, for example, a UART.

Operation of the Fifth Embodiment

Next, the operation of the wireless communication system for watercraft 1e according to the fifth embodiment of the present invention and shown in FIGS. 15 to 17 will be described in detail with reference to the flowchart of FIG. 18. The operation of the wireless device 21B (main control unit 210) mounted in the console unit of 20B of the watercraft B will be mainly indicated in this description.

Figure 18:
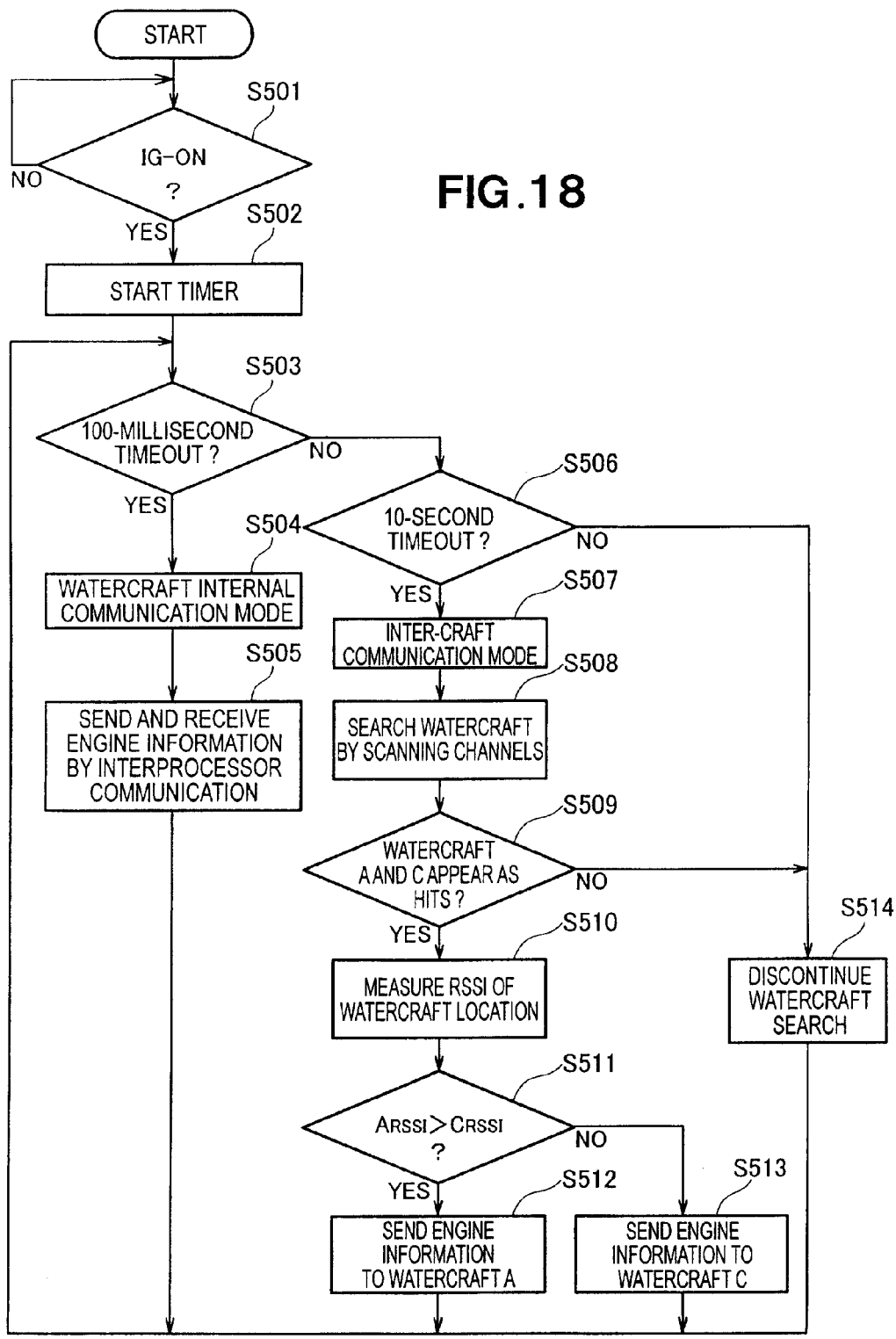
FIG. 18 is a flowchart showing an operation of the marine wireless communication system according to the fifth embodiment of the present invention.

In FIG. 18, when the driver turns on the ignition key of a remote controller disposed on the console unit 20B (IG-ON), this is detected by the ECU 12B of the outboard engine unit 10B (step S501 "YES"), and the ECU 12B accordingly notifies the main control units 110 of the wireless device 11B by interprocessor communication through the communication interface units 127 and 113. Upon receiving this notice, the main control unit 110 controls the short-range wireless communication unit 111 to transmit the fact that the engine has started to the wireless device 21B of the console unit 20B through the RF unit by short-range wireless communication using ZigBee.

When notified by the wireless device 21B that the engine has started, the ti console unit 20B (the main control unit 210 of the wireless device 21B) starts monitoring time using an inbuilt monitoring timer (step S502). This monitoring timer performs monitoring every 100 ms for short-range wireless communication using ZigBee, and every 10 s for middle- and long-range wireless communication with the cabin using WiMAX.

If a 100-ms timeout is detected (step S502 "YES"), the main control unit 210 sets the wireless device 21B to watercraft internal communication mode (step S504). The main control unit then transmits engine information acquired from the outboard engine unit 10B to the input/output device 22B by short-range wireless communication using ZigBee. Alternately, the main control unit sends operating information acquired from the input/output device 22B to the outboard engine unit 10B by short-range wireless communication using ZigBee (step S505). The engine information sent and received at this time refers, for example, to the actual engine speed, the requested engine speed, the battery voltage, and a variety of sensor data. The operating information refers, for example, to the tilt angle, the adjustment of the trim angle, the requested speed, and gear shift information.

However, if a 100-ms timeout has not been detected by the monitoring timer (step S503 "NO") and a 10-s timeout has been detected (step S506 "YES"), the main control unit 210 sets the wireless device 21B to inter-craft communication mode (step S507). In inter-craft communication mode, the main control unit 210 first searches watercraft by scanning channels (step S508). This watercraft search reveals the allocation of communication channels 1 to 16. The main control unit 210 successively switches through the allocated channels to search for other watercraft located nearby. This operation is carried out for all allocated channels.

Assuming that watercraft A and C have come up as hits (step S509 "YES"), the main control unit 210 measures the RSSI of the locations where the watercraft hits came up (step S510). The RSSI measured by the signal strength measurement unit 219 are used. Next, the main control unit 210 compares the RSSI of the watercraft A and the RSSI of the watercraft C, and controls the middle- and long-range wireless communication unit 216 to send the information about the engine and other parameters relating the watercraft to the watercraft with the highest RSSI. Specifically, if watercraft $A_{RSSI}$>watercraft $C_{RSSI}$ (step S511 "YES"), the main control unit sends the information relating to the engine or other parameters to the watercraft A (step S512). If watercraft $A_{RSSI}$<watercraft $C_{RSSI}$ (step S511 "NO"), the main control unit sends the information relating to the engine or other parameters to the watercraft C (step S513). Besides engine information, the information sent at this time is, for example, current location information, alarm information, breakdown information, or speed.

If no other watercraft was discovered or came up as a hit in the watercraft search and assessment procedure of step S509 (step S509 "NO"), the main control unit 210 discontinues the watercraft search and returns to the 100-ms timeout determination procedure of step S503 (step S514).

Figure 19:
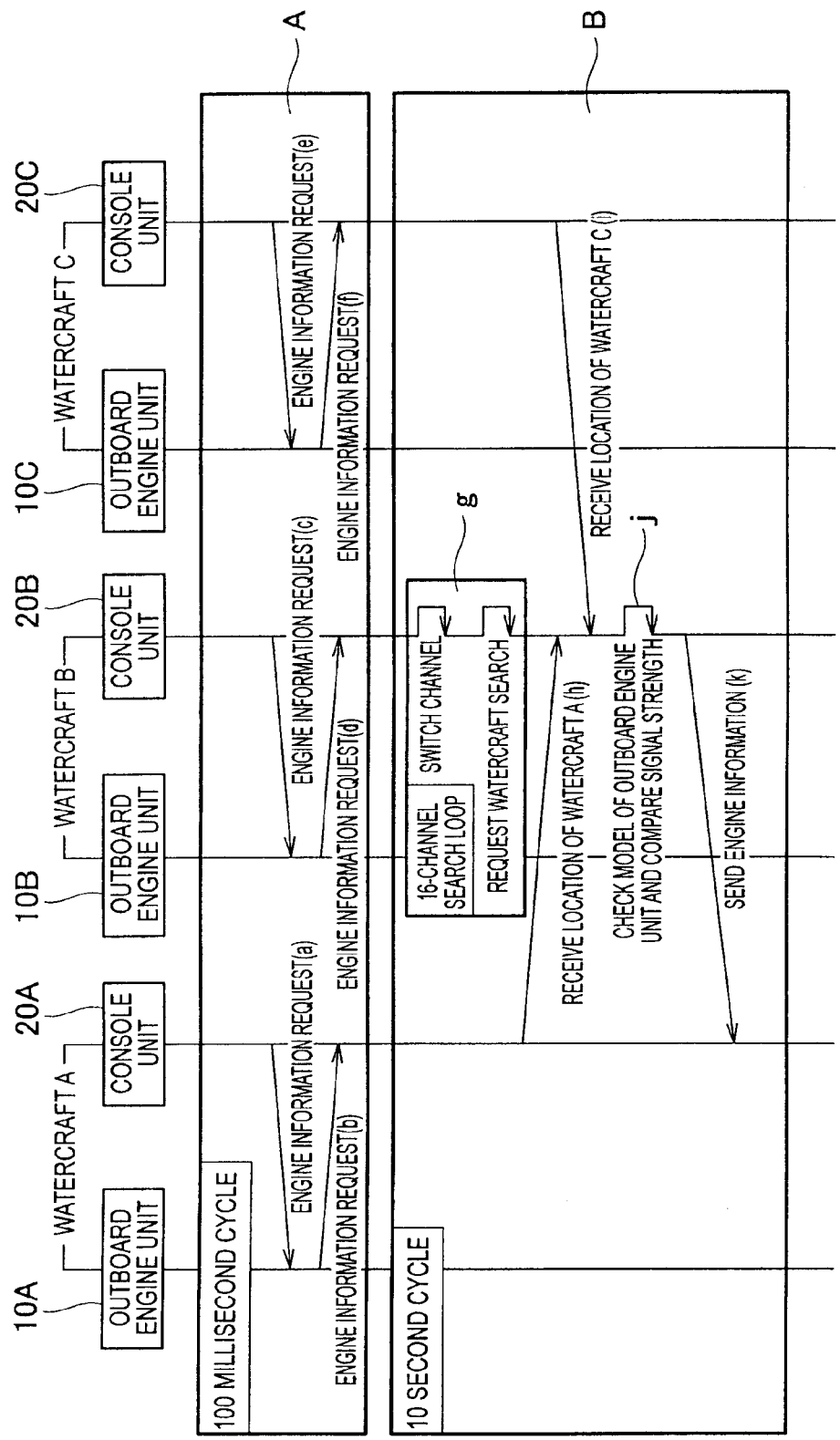
FIG. 19 is a sequence diagram showing an operation of the marine wireless communication system according to the fifth embodiment of the present invention.

FIG. 19 shows an operation sequence diagram of the wireless communication system for watercraft 1e according to this embodiment. FIG. 19 shows the flow of operations between outboard engine units 10A, 10B, and 10C and console units 20A, 20B, and 20C each time a watercraft internal communication is executed at 100-ms periods and inter-craft wireless communication is executed at 10-s periods.

As shown in FIG. 19, inside the individual watercraft, the outboard engine unit 10A (10B, 10C) sends engine information (b) ((d), (f)) in response to an engine information request a (c, e) issued by the console units 20A (20B, 20C). Each of the watercraft A, B, and C also searches for watercraft using the sixteen allocated channels at a 10-s period B. An example of the watercraft B searching for watercraft to find a communication counterpart will be indicated: When the watercraft B switches channels while a watercraft search request is sent to the watercraft A and C located nearby (g), the location information of the local watercraft is sent by the watercraft A and the watercraft C, and received by the watercraft B ((h), (i)). Next, the console unit 20B of the watercraft B compares the RSSI measured for the watercraft A and the watercraft C (j), and sends the engine information to the watercraft A, which has the highest RSSI ((k)).

Advantageous Effect of the Fifth Embodiment

According to the wireless communication system for watercraft 1e of the fifth embodiment of the present invention described above, the wireless device 21A (21B, 21C) communicates with the wireless device 11A (11B, 11C) of the outboard engine unit in its own watercraft A (B, C) on the basis of a first communication protocol, and with other watercraft on the basis of middle- and long-range communication (a second communication protocol having a longer communication range than the first communication protocol). Thus, the console unit 20A (20B, 20C) in the cabin can monitor the operating state of the outboard engine units 10 by short-distance wireless communication, such as ZigBee, and can exchange location information, for example, between watercraft using middle- and long-distance wireless communication, such as WiMAX. Therefore, monitoring the operating state of the outboard engine units 10 or location information between watercraft can be achieved by a unified wireless communication system, which can assure highly reliable wireless communication.

According to the fifth embodiment, the wireless device 21A (21B, 21C) communicates by short-distance wireless communication within the watercraft using ZigBee, and middle- and long-distance wireless communication between watercraft at a shorter cycle using WiMAX. Therefore, different communication cycles are used for wireless communication within the watercraft and wireless communication between cabins, which can assure even more highly reliable wireless communication with causing congestion. According to this embodiment, the wireless device 21A (21B, 21C) communicates by middle- and long-distance wireless communication with another watercraft having the highest measured RSSI. Therefore, communication with closer watercraft that have a higher RSSI is prioritized, which can contribute to safe navigation, such as by avoiding collision through exchanges of location information.

Although the fifth embodiment was described assuming use of ZigBee for short-distance wireless communication, a wireless network called WPAN (wireless personal area network) such as Bluetooth, Wi-Fi, or UWB (ultra-wideband), which use a narrower range (several meters to several tens of meters) than a wireless LAN, can be suitably applied instead of relying on ZigBee. Although the fifth embodiment was also described assuming use of WiMAX for middle- and long-distance wireless communication, an inter-craft communication system capable of constructing a network using wireless access points arranged in a grid to form multi-hops can be substituted instead of relying on WiMAX.

The wireless communications systems for watercraft 1a to 1e according to the first to fifth embodiments of the present invention are applied mainly to watercraft, and are obtained by disposing wireless devices capable of communicating in a narrower range than a wireless LAN in outboard engine units affixed to the sterns of the watercraft as well as in the cabins inside the watercraft. The wireless communication systems of the present invention are not limited to the watercraft as described above, and can be applied in all fields demanding communication within a narrow area; for example, operating information using a remote controller of an onboard information system inside a vehicle compartment.

Obviously, various minor changes and modifications of the present invention are possible in light of the above teaching. It is therefore to be understood that within the scope of the appended claims the invention may be practiced otherwise than as specifically described.

What is claimed is:

1. A marine wireless communication system comprising:
   at least one first wireless device disposed in at least one outboard engine unit secured to a stern of a watercraft, and
   at least one second wireless device disposed inside the watercraft,
   wherein the first wireless device is designed to communicate with the second wireless device according to a predetermined protocol wherein
   the first wireless device included a first communication unit for performing data communication with the second wireless device based on a first communication protocol, and a second communication unit for performing data communication based on a second communication protocol different from the first communication protocol,
   the second wireless device includes a first communication unit for performing data communication with the first wireless device based on the first communication protocol, and
   the first wireless device starts an initial setting process for the first communication unit and the second communication unit, and, after completion of the initial setting process, starts data communication between the first communication unit or the second communication unit and the first communication unit or the second communication unit of the second wireless device based on the first communication protocol or the second communication protocol.

2. The marine wireless communication system of claim 1, wherein the first wireless device places data communication in a communication-standby state based on the second communication protocol or the first communication protocol when communication is started based respectively on the first communication protocol or the second communication protocol.

3. The marine wireless communication system of claim 2, wherein
   a sensor for detecting operating conditions of an outboard engine unit is connected to the second wireless device, and
   when the sensor detects an abnormality in the outboard engine unit, the first wireless device controls the first communication unit or the second communication unit, restarts data communication based on the second communication protocol or the first communication protocol in the communication-standby state, and performs data communication with the second communication unit based on the second communication protocol, and with the first communication unit based on the first communication protocol.

4. The marine wireless communication system of claim 1, wherein the first wireless device includes:
   a signal strength measuring unit for successively measuring a signal strength of a plurality of previously allocated communication channels when power has been turned on and before an outboard engine unit has been started; and
   a control unit for switching to another communication channel free of radio interference among the plurality of communication channels, when the measured signal strength has been compared to a predetermined signal strength threshold value, and the measured signal strength has been determined to be lower than the signal strength threshold value.

5. The marine wireless communication system of claim 4, wherein the control unit stops measuring the signal strength of a communication channel and stops switching communication channels once the start of an engine in the outboard engine unit has been detected.

6. The marine wireless communication system of claim 1, wherein the at least one outboard engine unit is among a plurality of outboard engine units, and the at least one first wireless device is among a plurality of first wireless devices, and each of the plurality of first wireless devices includes:
- a communication unit for performing data communication with the at least one second wireless device; and
- a control unit for performing mutual authentication between the second wireless devices and a first wireless device disposed in any outboard engine unit, and performing data communication between the first wireless device and a mutually authenticated second wireless device via the communication unit, when an outboard engine unit among a plurality of outboard engine units has been detected to have started.

7. The marine wireless communication system of claim 6, wherein each control unit performs mutual authentication each time an engine is detected to have started in at least one of the plurality of outboard engine units.

8. The marine wireless communication system of claim 7, wherein the control units perform mutual authentication with the plurality of second wireless devices by controlling the communication devices, and sending to all of the second wireless devices specific information required for mutual authentication.

9. The marine wireless communication system of claim 8, wherein, when information specific to an outboard engine unit has been received from one of the plurality of second wireless devices, the control units perform configuring with the second wireless device upon a verification having been made that information specific to the second wireless devices required for mutual authentication has been sent to all of the second wireless devices.

10. The marine wireless communication system of claim 7, wherein the control units perform mutual authentication with the plurality of second wireless devices by controlling the communication devices, and sending to all of the second wireless devices specific information required for mutual authentication.

11. The marine wireless communication system of claim 10, wherein, when information specific to an outboard engine unit has been received from one of the plurality of second wireless devices, the control units perform configuring with the second wireless device upon a verification having been made that information specific to the second wireless devices required for mutual authentication has been sent to all of the second wireless devices.

12. The marine wireless communication system of claim 1, wherein
- the at least one outboard engine unit is among a plurality of outboard engine units, and the at least one first wireless device is among a plurality of first wireless devices,
- each of the plurality of first wireless devices uses a communication channel allocated in advance to a particular outboard engine unit among the plurality of outboard engine units, and sends to the at least one of the second wireless devices information regarding engine operating conditions detected by a sensor provided to the particular outboard engine unit, and
- the second wireless device switches successively between communication channels, receives information regarding operating conditions for the outboard engine unit, and performs information processing based on the received information.

13. The marine wireless communication system of claim 12, wherein, when an outboard engine unit is detected to have started after power is turned on, each of the plurality of first wireless devices, sends the engine information in a first period using a communication channel allocated in advance, and
- the second wireless devices determine, before an engine has been detected to have started, whether or not engine information has been received in a second period that is shorter than the first period; and, when engine information has been received, switch to a communication channel after processing the received engine information, and, when engine information has not been received, switch promptly to a communication channel and enter a standby state to receive engine information.

14. The marine wireless communication system of claim 1, wherein
- the at least one second wireless device is among a plurality of second wireless devices, and
- each of the second wireless devices performs communication with the first communication unit in the first wireless device via a first communication unit for performing communication based on a first communication protocol; and performs data communication with at least one other watercraft via a second communication unit (212) for performing communication based on a second communication protocol for communicating over distances longer than with the first communication protocol.

15. The marine wireless communication system of claim 14, wherein the second wireless device controls the first communication unit and the second communication unit, and communication using the first communication protocol is performed in a shorter period than communication performed with the at least one other watercraft using the second communication protocol.

16. The marine wireless communication system of claim 15, wherein the second wireless device also has a signal strength measuring unit for measuring a reception field strength of a signal generated by the at least one watercraft; and performs communication according to the second communication protocol with at least one other watercraft having a highest measured reception field strength.

17. The marine wireless communication system of claim 14, wherein the second wireless device also has a signal strength measuring unit for measuring a reception field strength of a signal generated by the at least one watercraft, and performs communication according to the second communication protocol with at least one other watercraft having a highest measured reception field strength.

\* \* \* \* \*